Feb. 19, 1963 W. P. HIDDEN ETAL 3,077,619
APPARATUS FOR PERFORMING SEQUENTIAL
OPERATIONS ON SHOES
Filed April 19, 1960 32 Sheets-Sheet 16

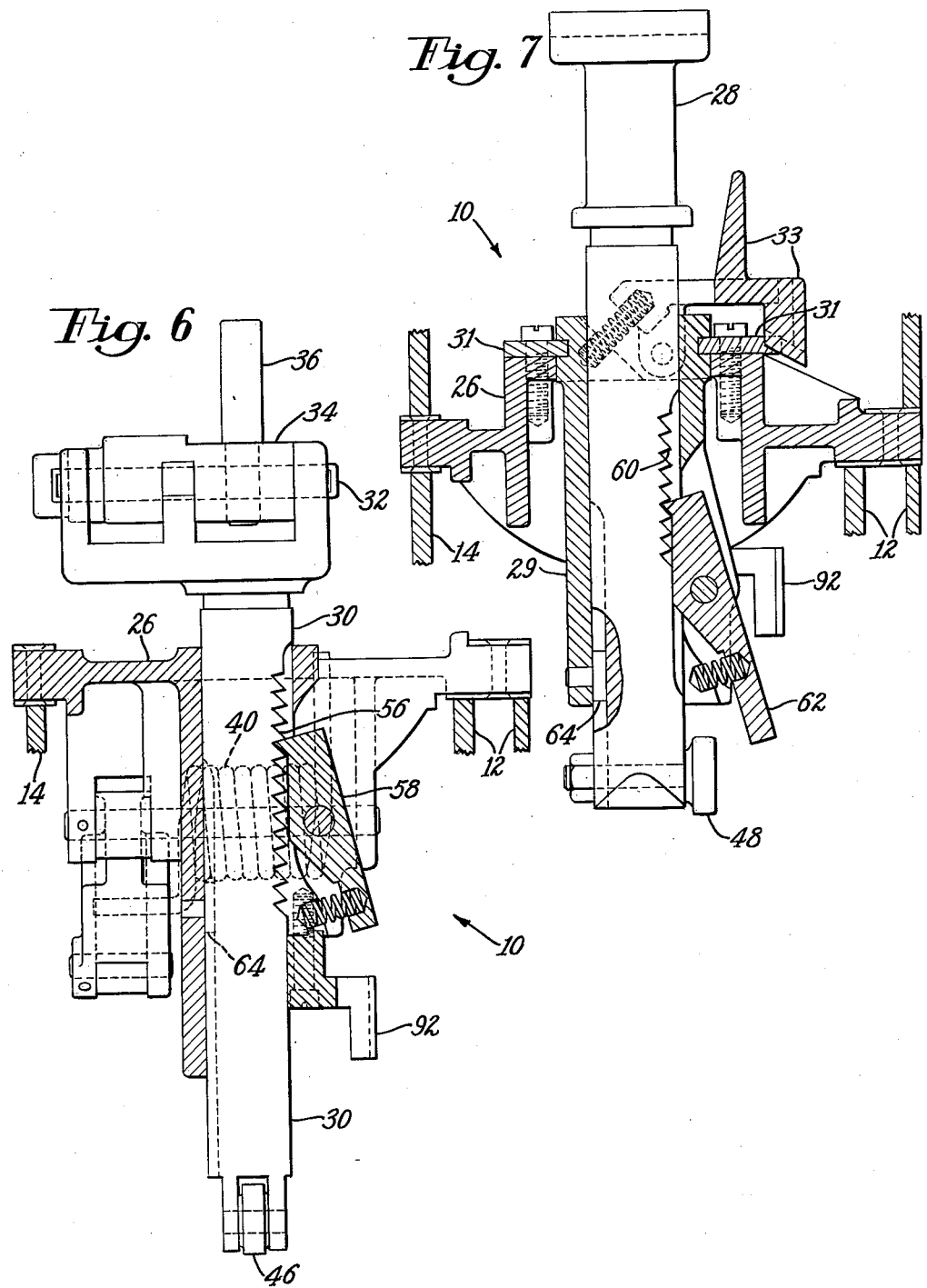

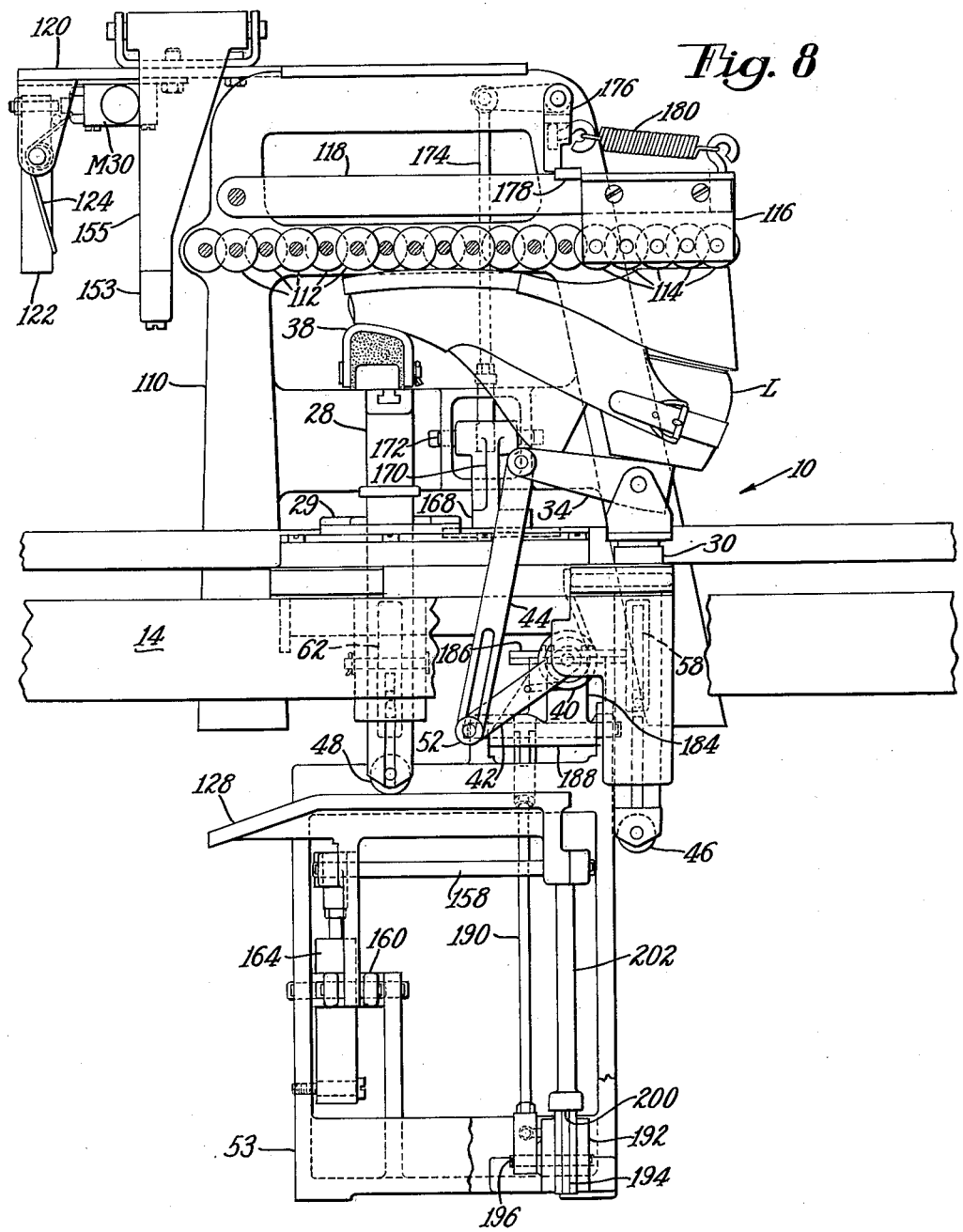

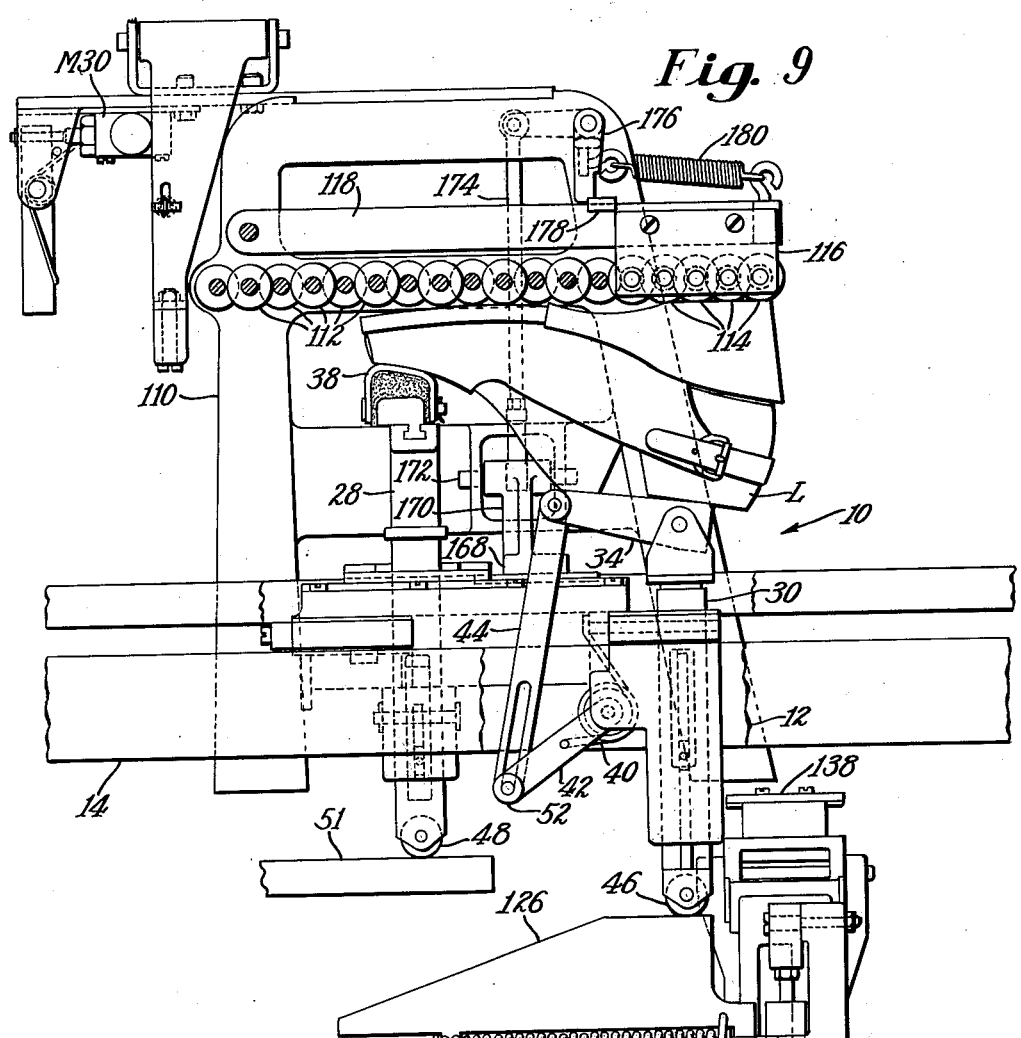

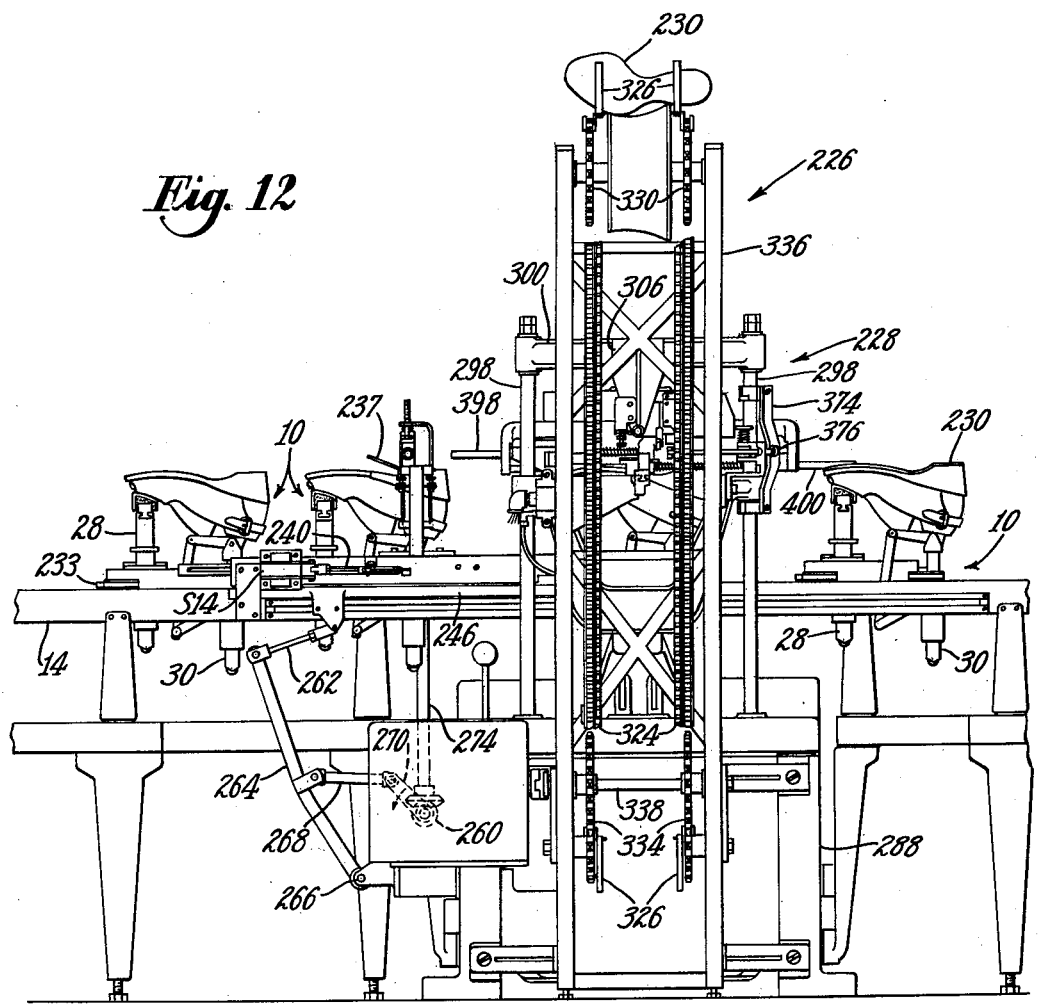

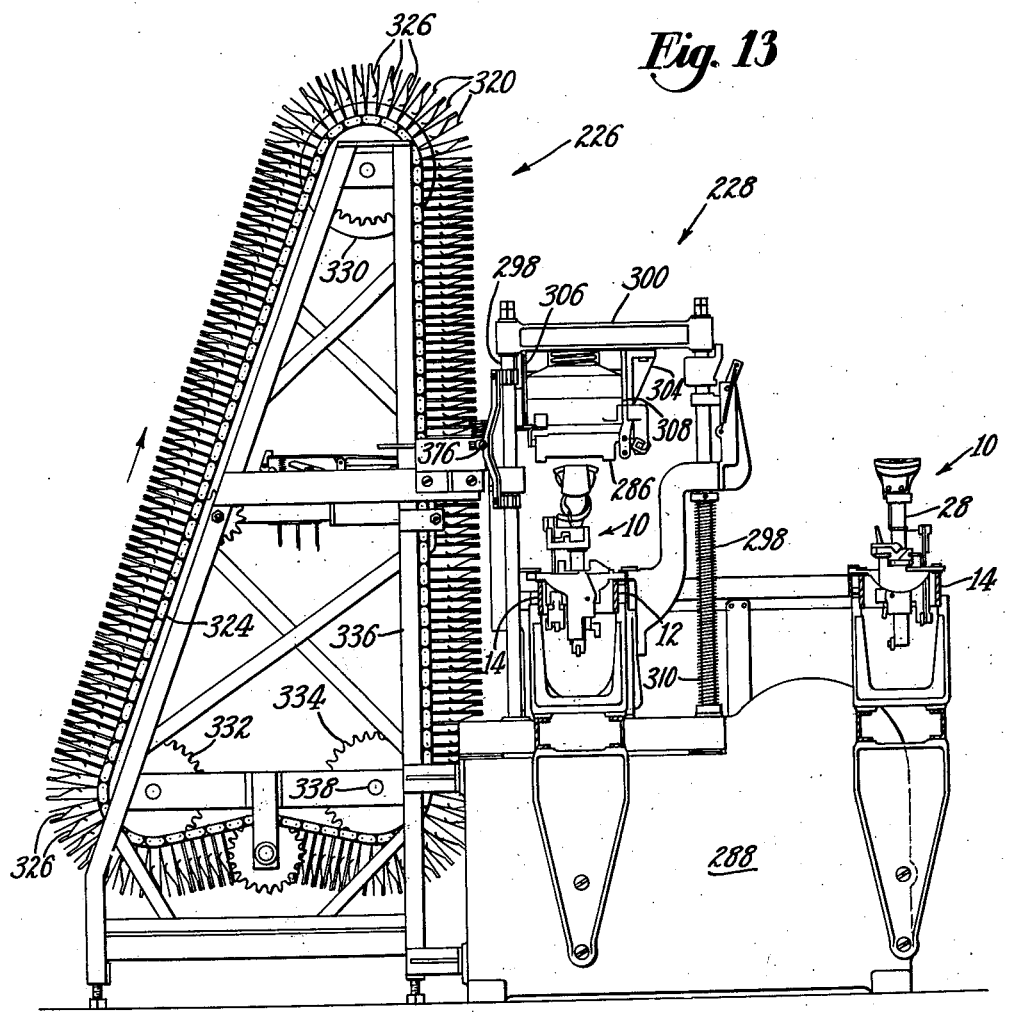

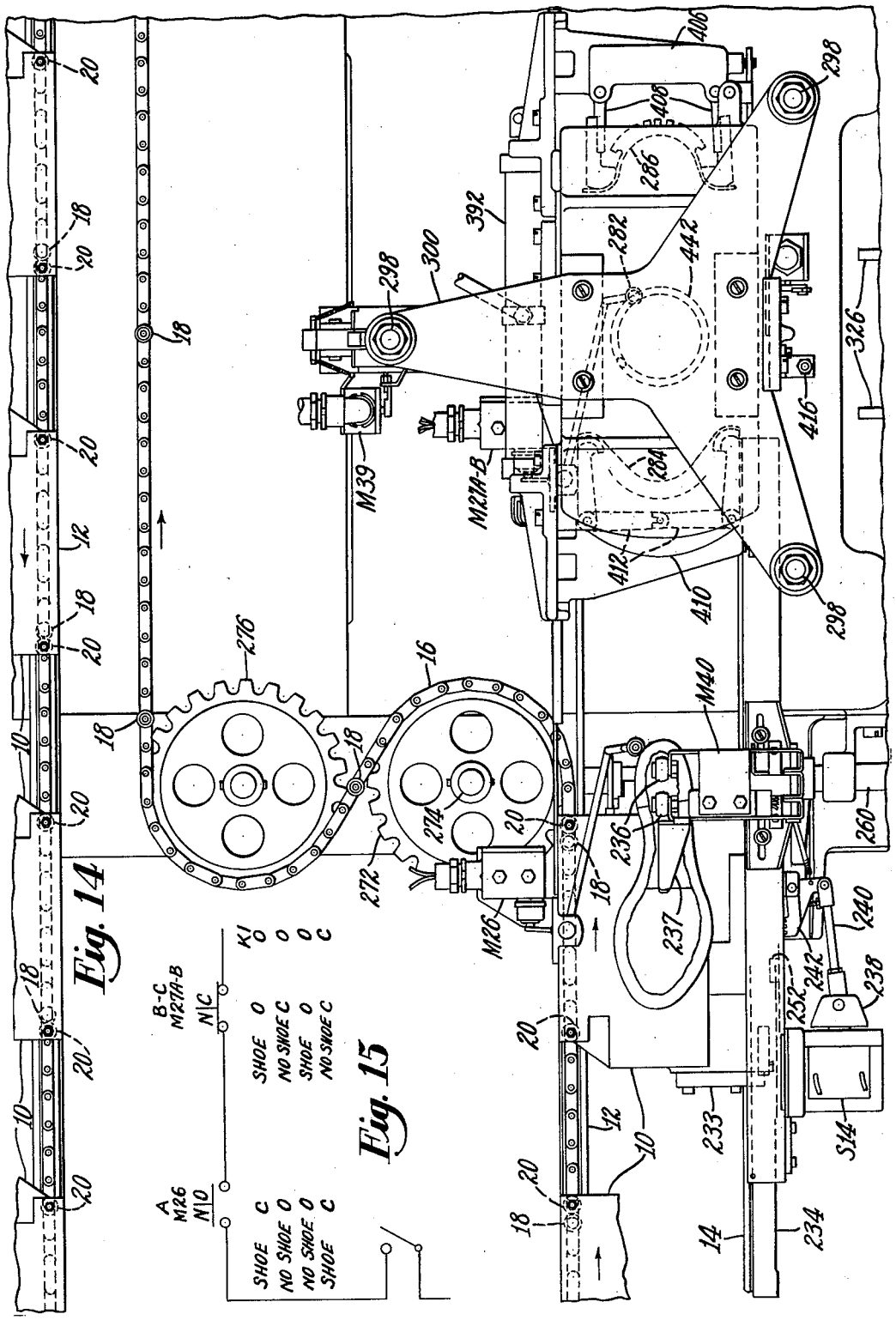

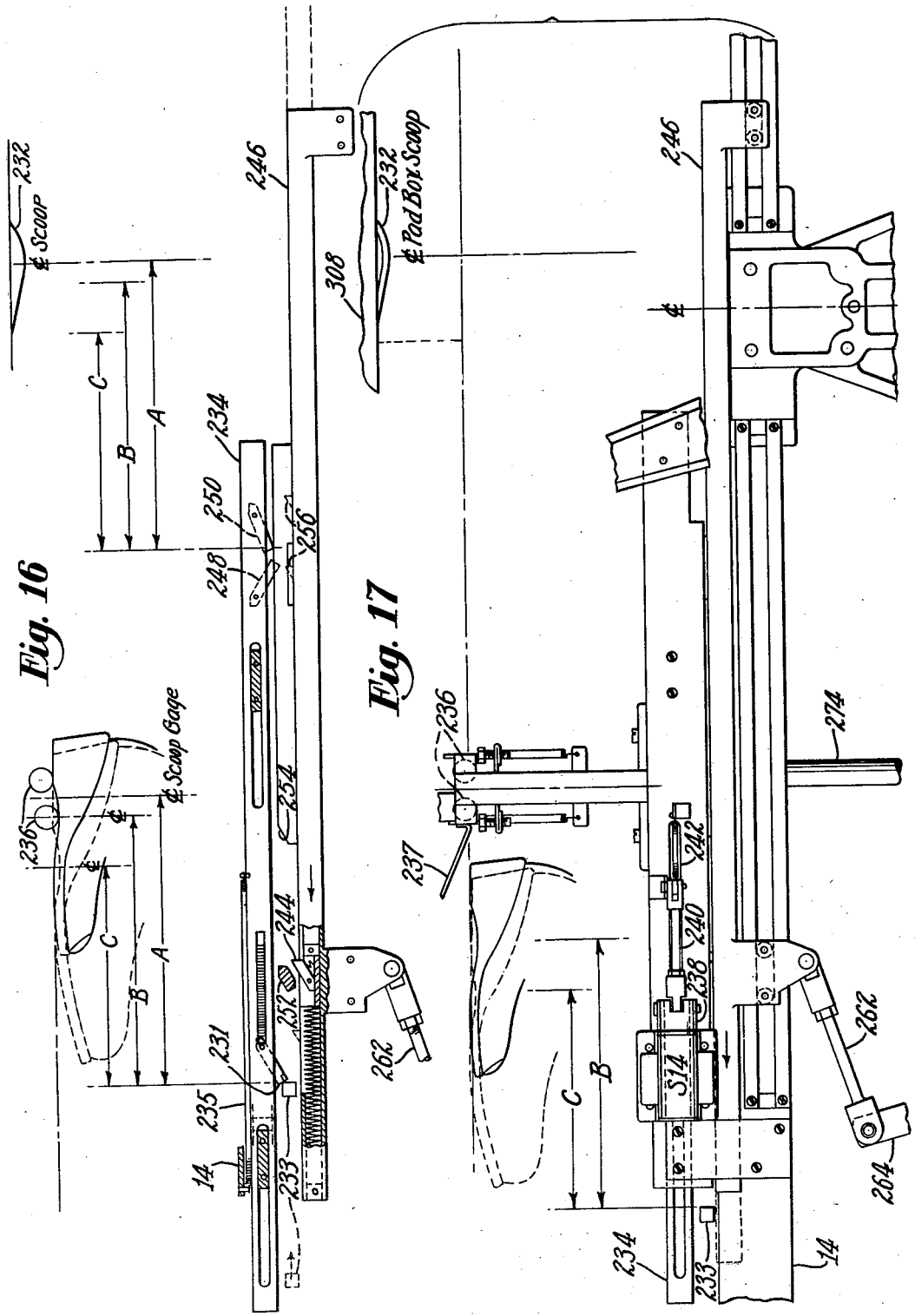

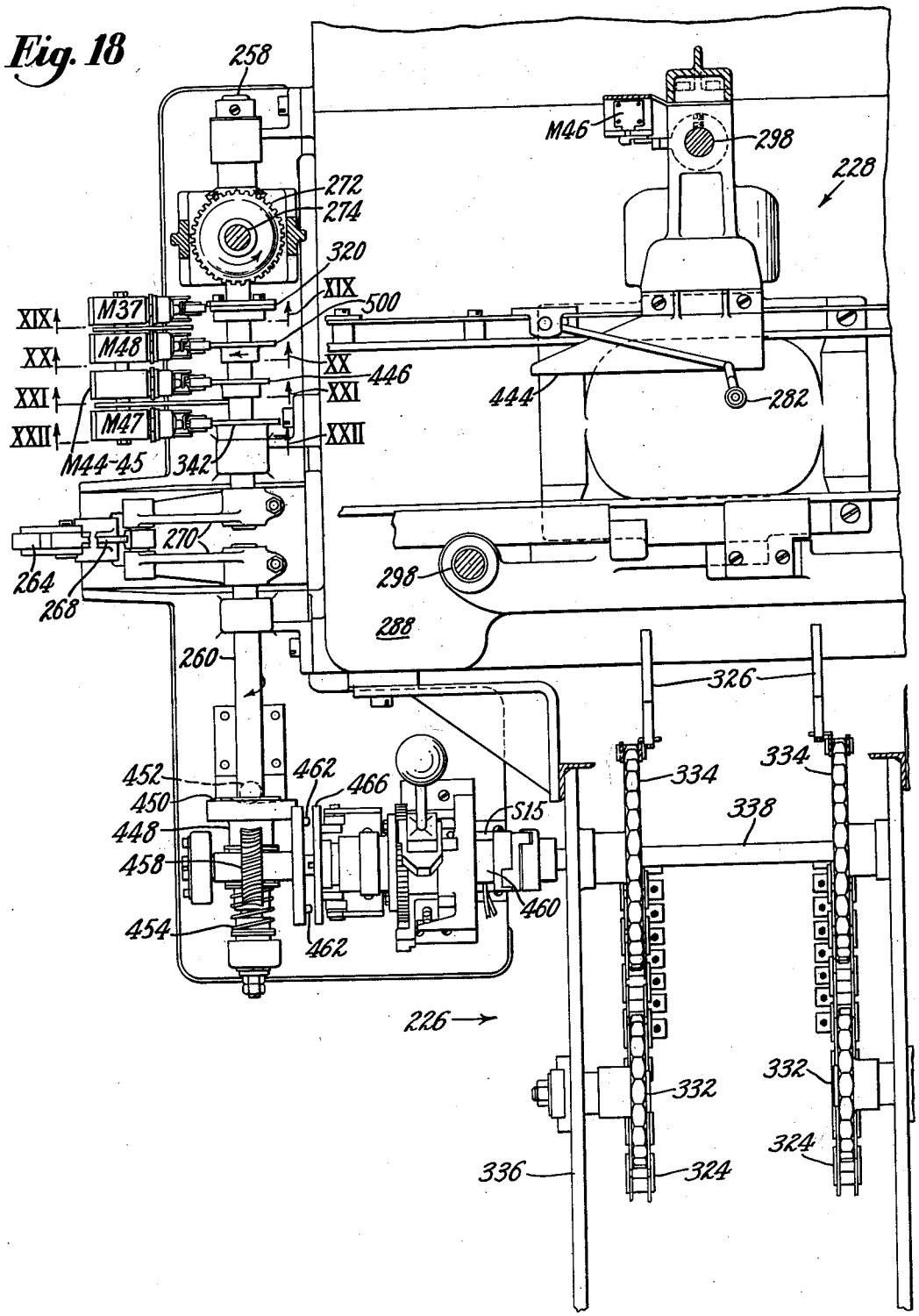

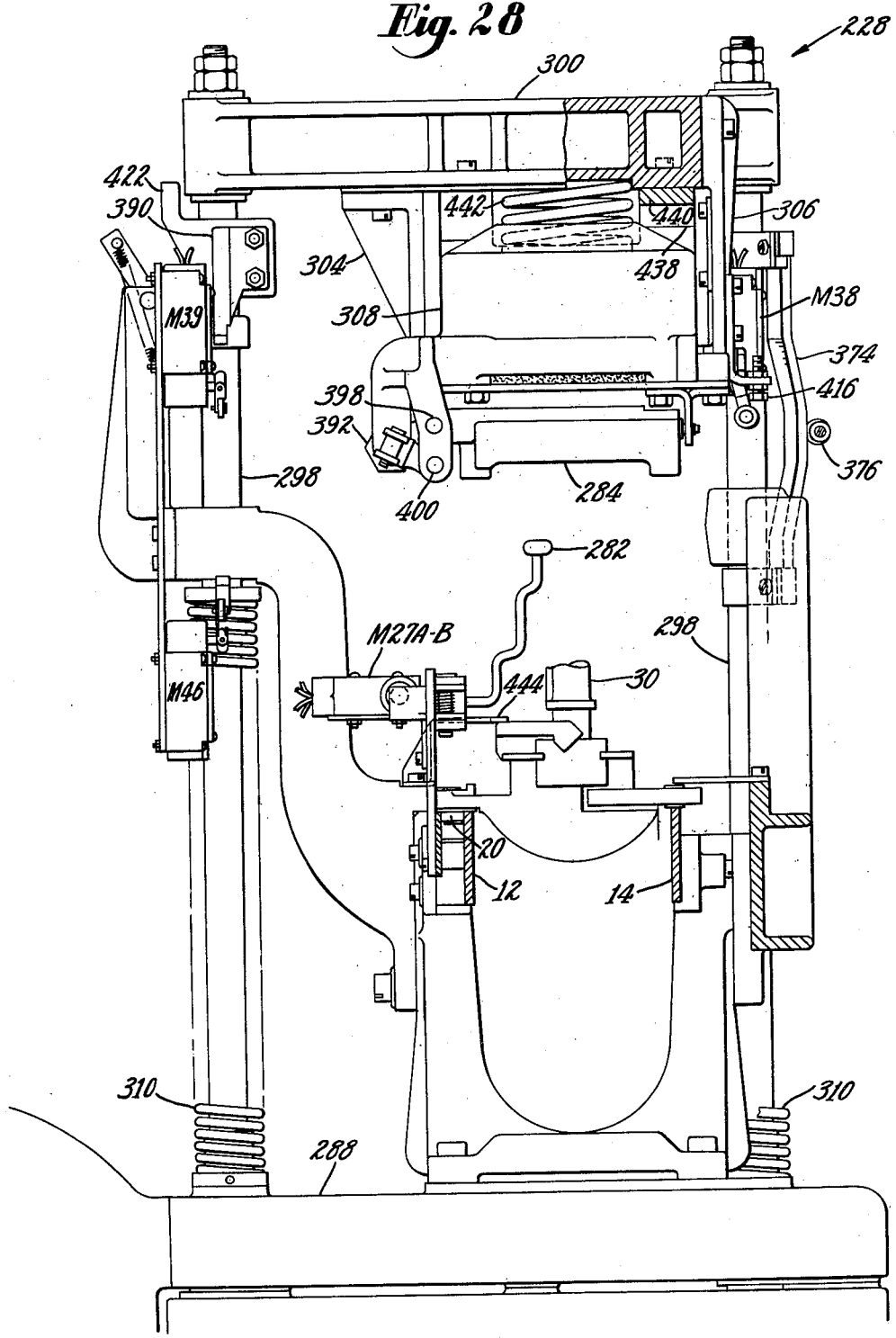

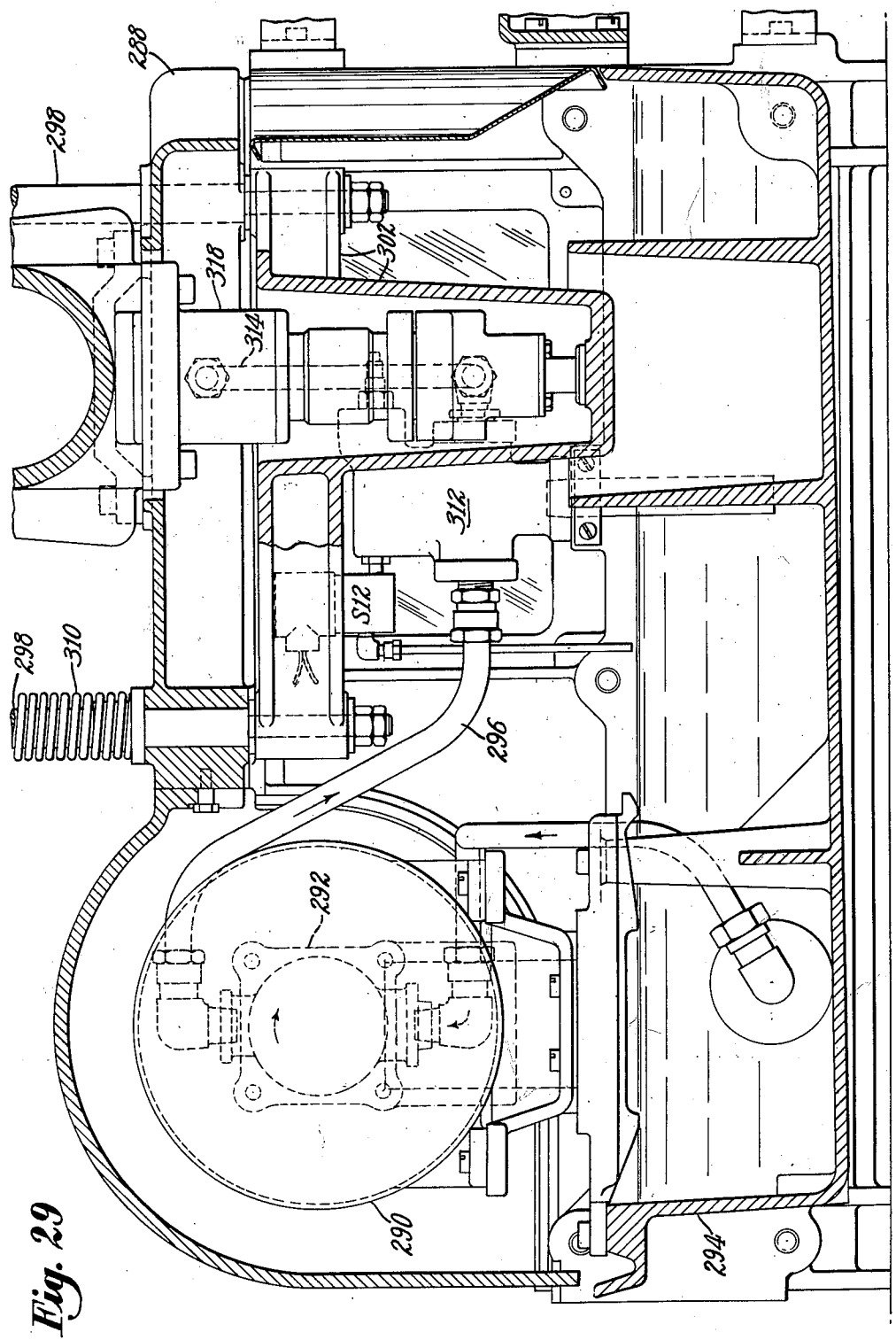

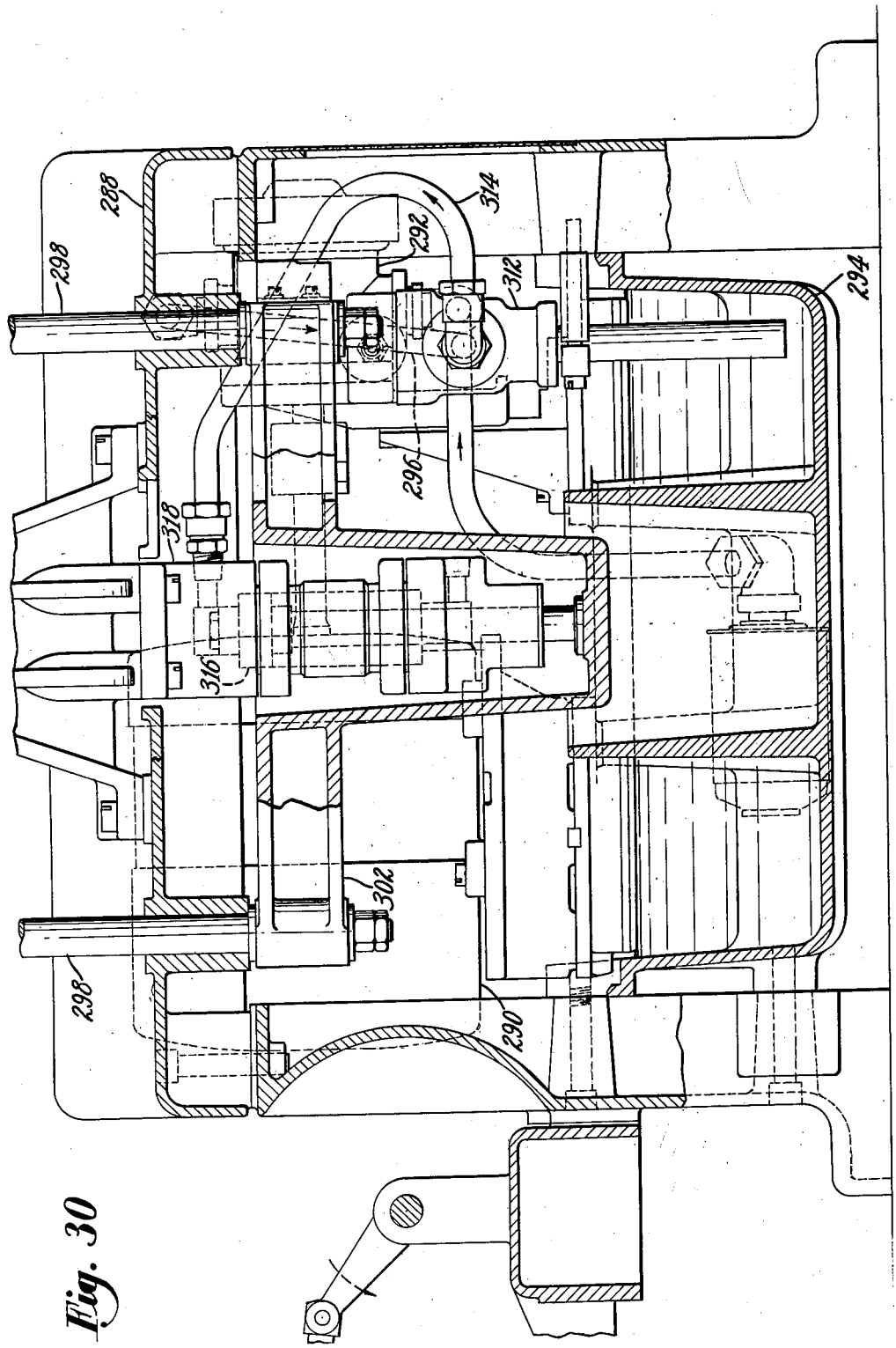

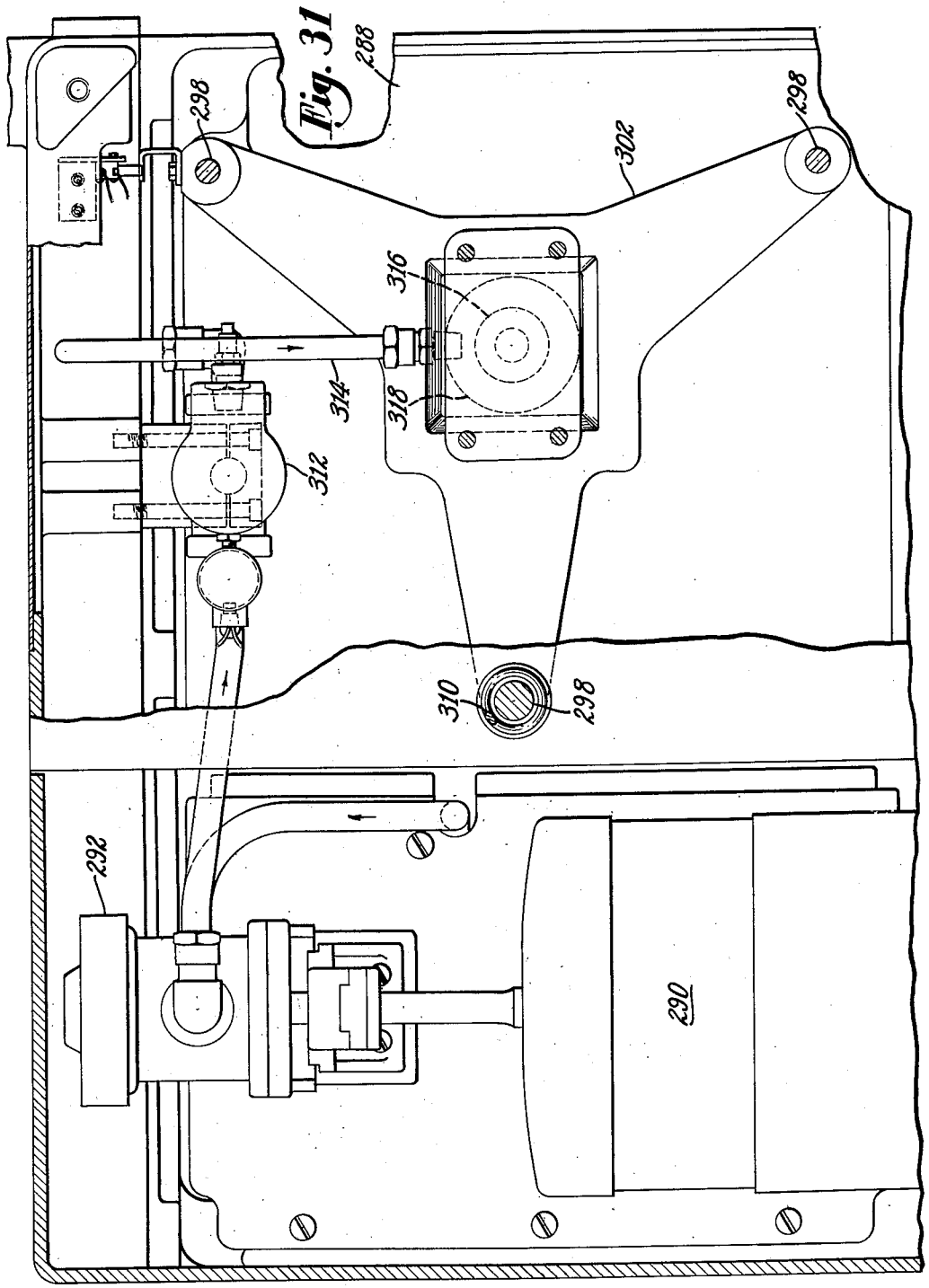

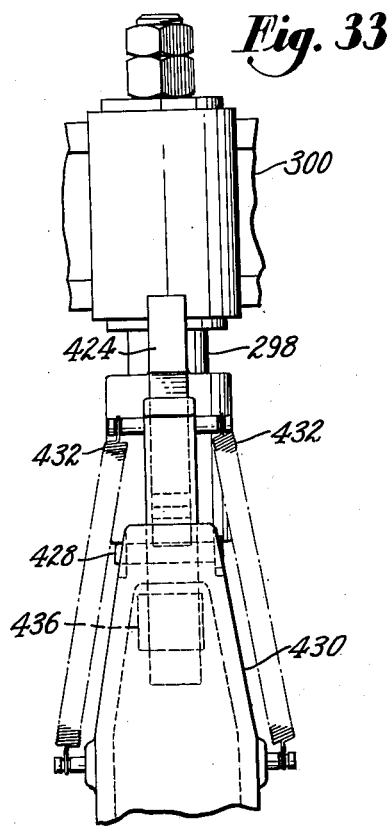
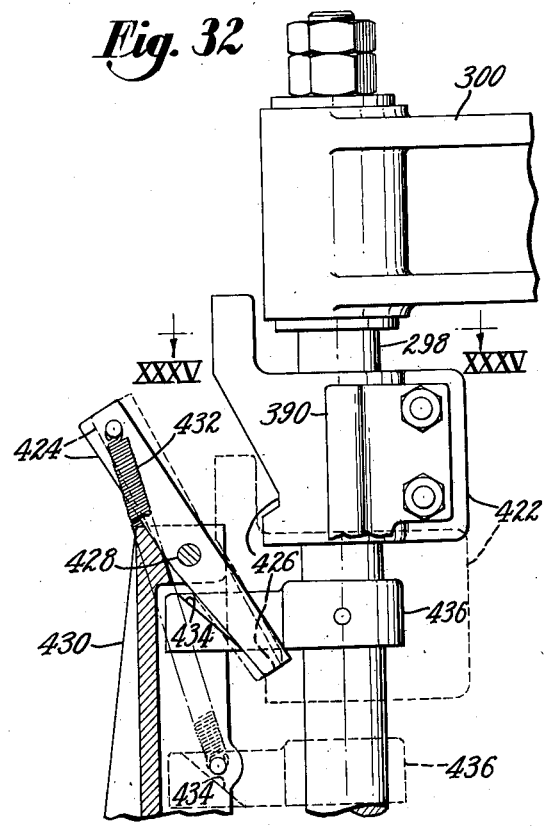
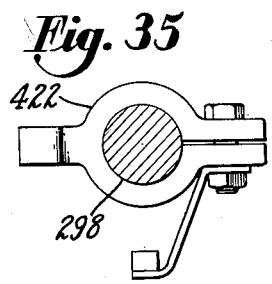
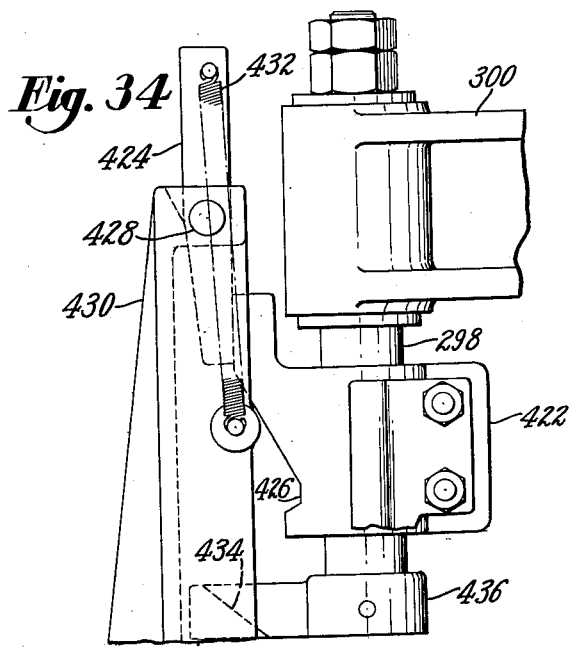

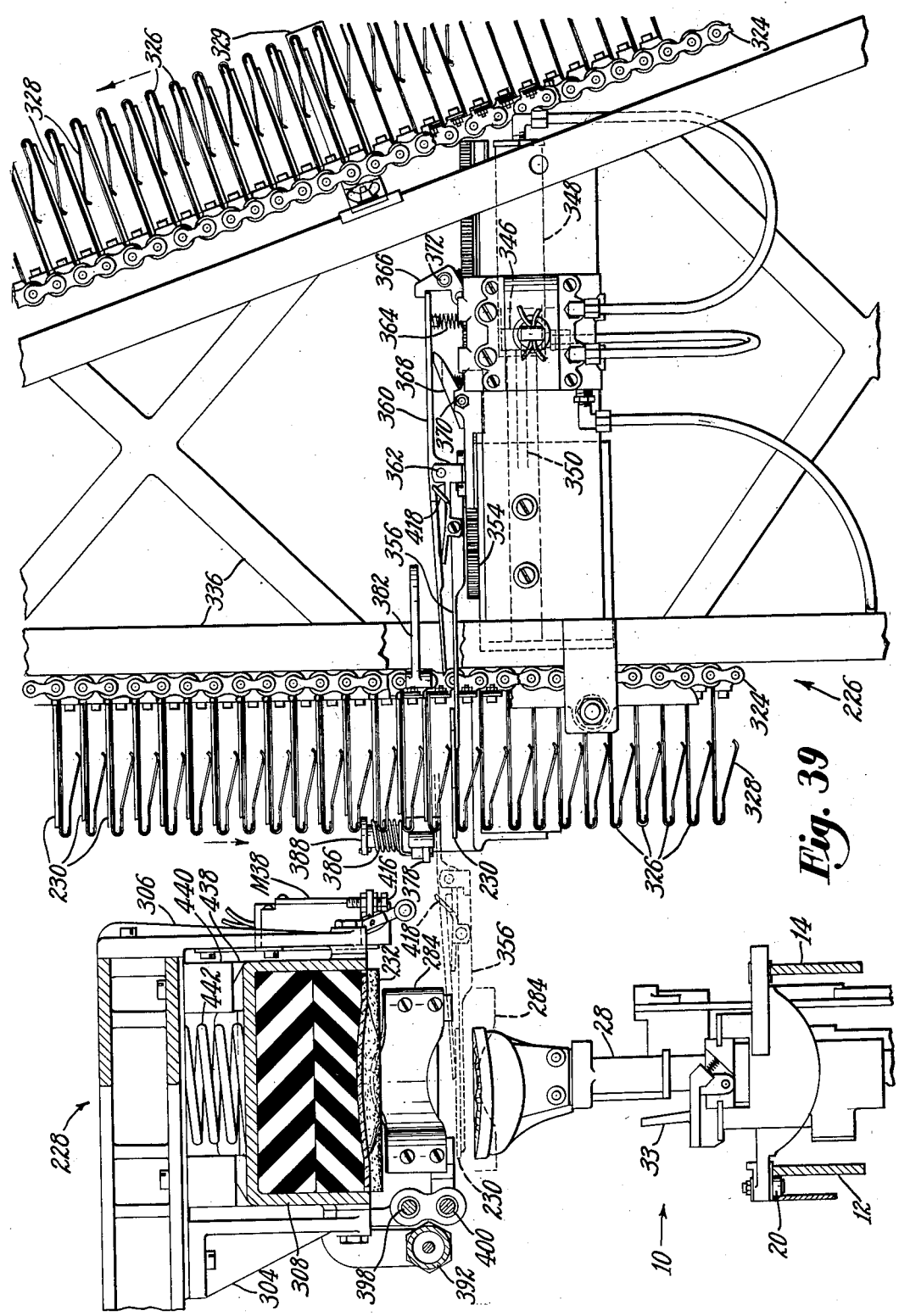

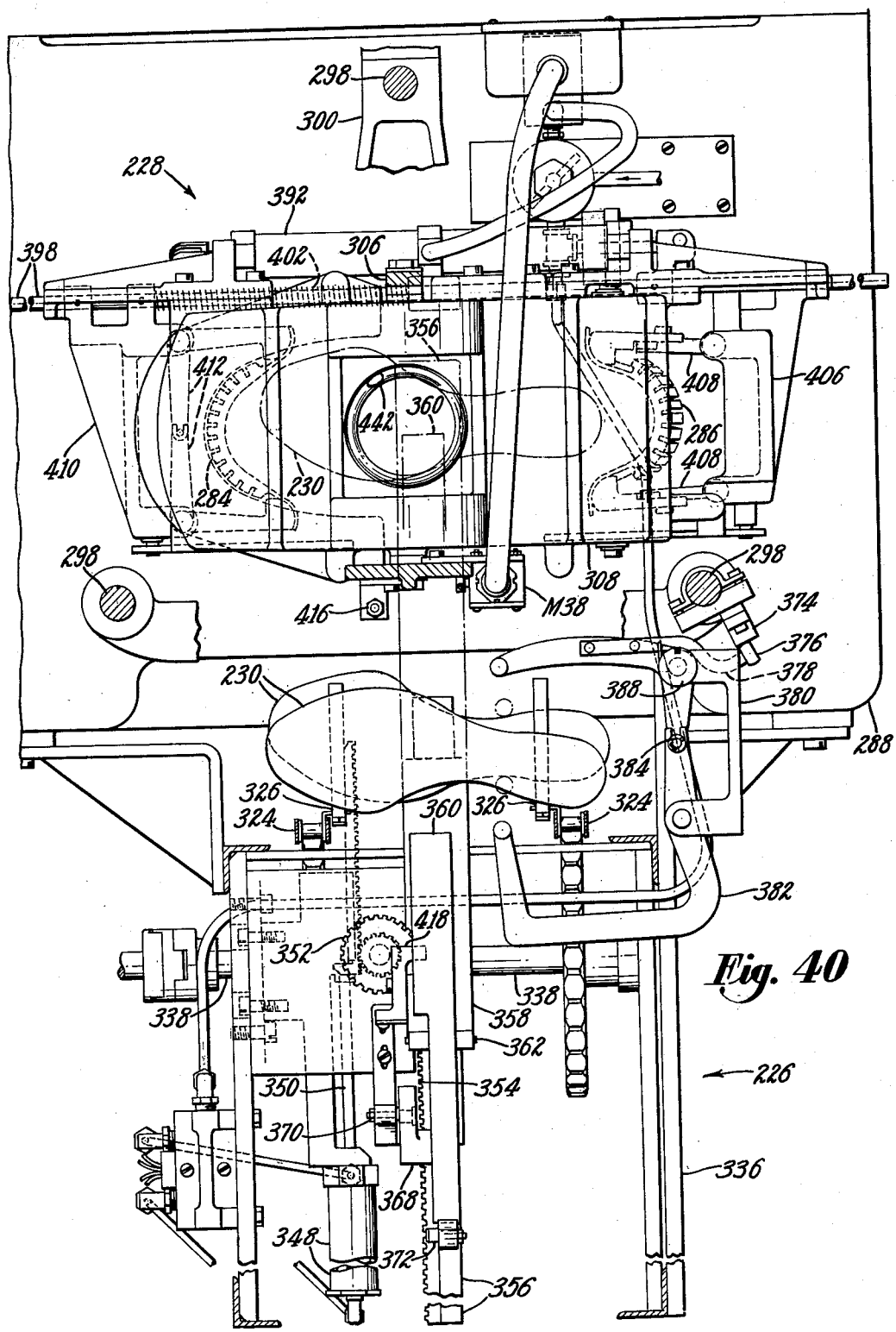

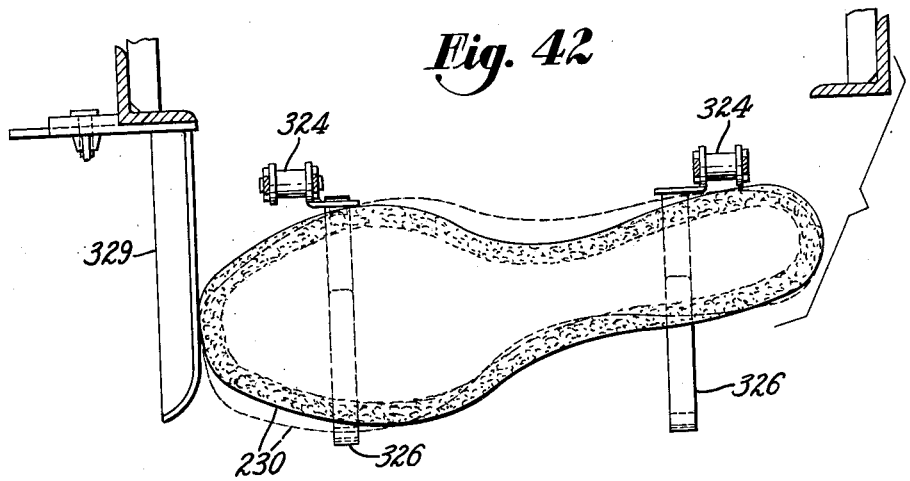
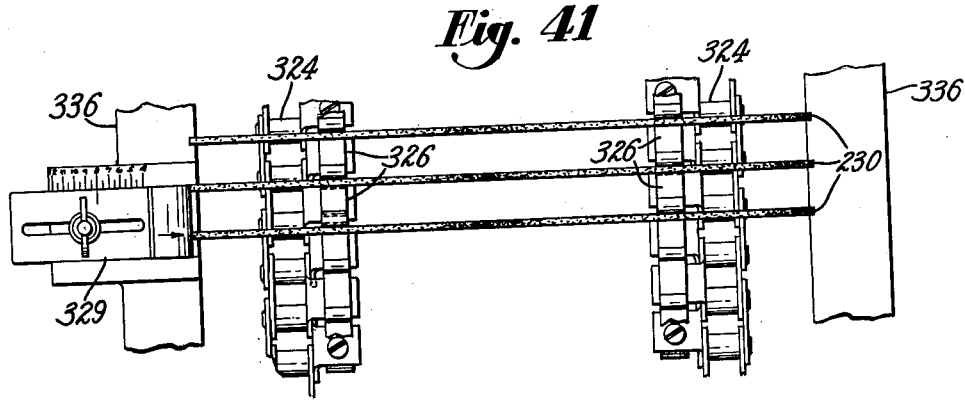
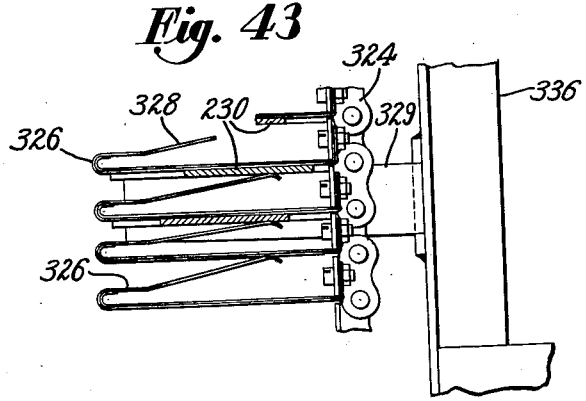

United States Patent Office 3,077,619
Patented Feb. 19, 1963

3,077,619
APPARATUS FOR PERFORMING SEQUENTIAL
OPERATIONS ON SHOES
William P. Hidden, Wenham, and Vernon H. Meyer, Beverly, Mass., assignors to United Shoe Machinery Corporation, Boston, Mass., a corporation of New Jersey
Filed Apr. 19, 1960, Ser. No. 23,280
23 Claims. (Cl. 12—1)

This invention relates to an automatic shoemaking system, and more particularly to apparatus for sequentially performing various related shoemaking operations on shoes being successively fed to a series of stations, the function of at least one of the stations of the apparatus necessitating each shoe to be treated thereat at a different operating rate or during a period of dwell. As herein illustrated the invention is embodied in a conveyorized rink particularly well adapted to complete the construction of slip-lasted shoes by a series of bottoming operations, but it is to be noted that in its various aspects the invention is not thus limited in use as to any particular type of shoe nor as to the specific sequence or machine construction herein shown.

Hitherto shoemaking machinery has been designed to carry work from one station to another, each station being adapted to perform an operation on the work while it is positioned thereat. When, as is often the case, the work to be performed at one station of a series requires or deserves a dwell, or a different operating interval, a special work feeding problem arises as to how mechanically to incorporate that station in the system advantageously and without penalizing the efficiency of the system as a whole. It is found, for instance, that in making slip-lasted shoes a series of related steps on successive shoe bottoms will prepare them, as they progress from station to station, for adhesive attachment of their soles, but that the nature of this latter operation dictates that for best results each shoe should have a period of dwell in the sole attaching station before proceeding. In other words, of the operations to be performed some are continuous or progressive in character and at least one is preferably intermittent or of different operating rate so that the problem becomes one of economically maintaining the output of the system as a whole, or at least not diminishing the output of the continuously operating stations.

In view of the foregoing it is a general object of this invention to provide improved shoemaking apparatus for performing a plurality of operations simultaneously upon shoes as they are being carried through a series of operating stations some of which have a substantially constant operating rate and at least one of which is adapted to function at a different rate. In accordance with this object a feature of the invention resides in a conveying means for carrying the shoes to and away from said one station with an intermittent movement and for presenting the shoes to the other of said stations with a continuous movement at the frequency of a cycle of said intermittent movement.

In the machine herein illustrated the shoes to be operated upon are mounted on lasts which are successively carried in bottom-up position by a series of novel pallets. For moving the pallets to and through a series of operating stations an endless drive chain is arranged in a horizontal plane, the pallets having equispaced connection with the drive chain. The sequence of the stations herein shown is as follows: Loading, Leveling, Heel Roughing, Toe Roughing, No. 1 Side Roughing, No. 2 Side Roughing, No. 1 Cement Head, No. 2 Cement Head, Oven Sections, and, lastly, a Sole Spotting and Attaching Station. Although the Roughing Stations are herein shown and generally described, their particular features of novelty are more fully described and illustrated and claimed in a copending application Serial No. 164,266, filed January 4, 1962, in the names of Ralph E. Pearsall and William R. Wade. Similarly, the cementing stations are more fully disclosed and claimed in a copending application Serial No. 172,013, filed February 8, 1962, in the the names of George A. Fuller, Jr., et al.

In the illustrative machine the successive stations cooperate with the novel pallets, which initially have been manually loaded, the pallets automatically positioning the shoes for the action of the operating devices of the stations. Each pallet has a toe post and a heel post which are mounted for vertical sliding movement. A multiple pawl cooperates with a ratchet on each post for locking it against downward movement, and the heel post carries a pivoted jack pin which, through a link and a spring-biased lever, causes the forepart of the shoe normally to be held down against the toe post. Means on the pallet conveying means is arranged to unclamp each shoe arriving at the loading station and to clamp the newly loaded shoe about to pass through the leveling station. In a further feature of the invention the pallets are caused advantageously to pass through each station with their shoe bottoms occupying on optimum operating height determined at the levelling station. They travel at a constant velocity except at the spotting and attaching station wherein each shoe dwells to receive a sole. Here the drive chain of the conveyor means bypasses the attaching station and the pallets are delivered to and away from this machine by a reciprocatory feeding slide. The reciprocating rate of this slide corresponds to the rate at which the drive chain delivers pallets to each of the stations.

Since the scoop locality on shoes of different styles may be spaced at different distances from the thimble of the last, novel provision is made in accordance with another feature of the invention for locating each pallet at the spotting and attaching station so that the scoop portion of each shoe will be in register with the corresponding portion of the presser of the spotting and attaching machine. For this purpose there is provided a positioning slide having a limited sliding movement along a rail of the pallet conveyor means, the slide being locked thereto automatically in such a position that a slot on the positioning slide receives a tongue on the pallet when the scoop of the shoe on the pallet is in register with the presser of the spotting and attaching station. The locking device for the positioning slide is operated upon closure of a microswitch when two feeler rolls engaging the scoop assume a common horizontal plane corresponding to the lowest portion of the scoop. Further features of novelty are to be recognized in the means for indexing a sole carrier at the spotting and attaching station for cooperation with the properly positioned pallet, interlock means for guarding against the operation of a station upon a pallet not carrying a shoe and to avoid any shoe being continuously operated upon by any one station, and various novel details of cooperation between the respective stations and the pallet conveying means.

The foregoing and other novel details of construction will now be set forth with more particularity in connection with an illustrative machine in which the invention is embodied, and with reference to the accompanying drawings thereof, in which:

FIG. 6 is a vertical section taken on the line VI—VI in FIG. 5 and looking toewardly, indicaing pawl and ratchet mechanism controlling the heel post;

FIG. 7 is a vertical section showing pawl and ratchet mechanism associated with the toe post shown in FIG. 5;

FIG. 8 is a view in side elevation showing a looaded pallet passing through the leveling station;

FIG. 9 is a view corresponding to FIG. 8, but showing the work at a subsequent stage;

FIG. 9A is an end elevation of table locking mechanism partly shown in FIGS. 2 and 3 and duplicating that shown in FIG. 11;

FIG. 12 is a view in side elevation of the spotting and attaching station;

FIG. 13 is a view in end elevation of the spotting and attaching station;

FIG. 14 is a plan view of the pallet conveying means in relation to the spotting and attaching station;

FIG. 15 is a schematic showing of the electrical means for determining when the conveying means will be stopped according to the presence of a shoe on a pallet;

FIG. 16 is a schematic diagram indicating the relationship of a pallet locking slide and a pallet transfer slide for positioning a shoe with relation to a pad box scoop;

FIG. 17 is a view corresponding largely to FIG. 16;

FIG. 18 is a plan view of the lower portion of the spotting and attaching station;

FIG. 28 is a view in end elevation of the sole presser means and its controls;

FIG. 29 is a view in elevation of the hydraulic means powering the sole presser head;

FIG. 30 is an end elevation of the mechanism shown in FIG. 29;

FIG. 31 is a plan view of portions of the hydraulic mechanism shown in FIGS. 29 and 30;

FIG. 32 is a view in elevation of latching means associated with the presser head;

FIG. 33 is a view corresponding to FIG. 32 but at right angles thereto;

FIG. 34 is a view corresponding to FIG. 32, the parts occupying different positions;

FIG. 35 is a section taken on the line XXXV—XXXV of FIG. 32;

FIG. 39 is a view in end elevation of a pallet carrying a shoe on which a sole is about to be presented from a sole carrier;

FIG. 40 is a plan view of the sole attaching station and associated means for transferring successive soles thereto from the sole carrier;

FIG. 41 is a detail view in elevation of gage means associated with sole receiving clips of the sole carrier;

FIG. 42 is a plan view of subject matter corresponding to FIG. 41;

FIG. 43 is a view in end elevation of several sole carrying clips;

Figure 4:
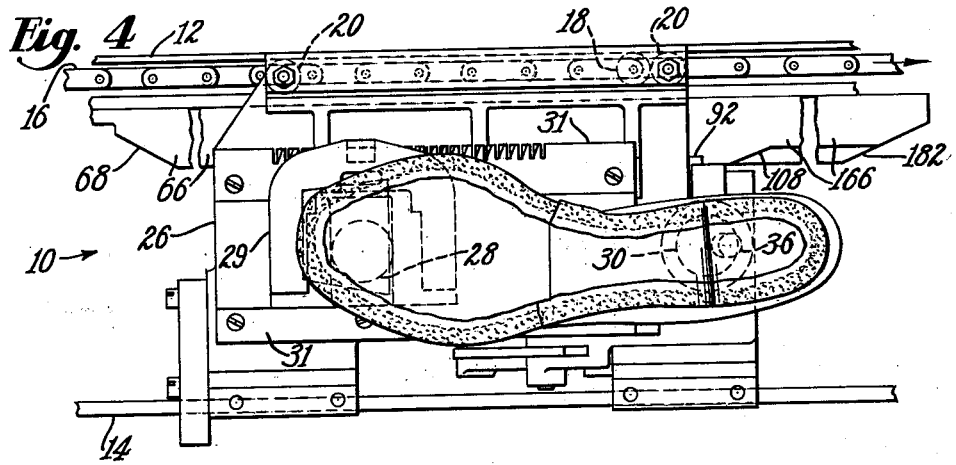
FIG. 4 is a plan view of the pallet shown in FIG. 3.

The illustrated apparatus comprises a conveyorized rink having an oval track arranged in a horizontal plane at about waist height. In the front run of the conveyor, schematically shown in FIG. 1, one of its (usual two) operators is positioned between a sole spotting and attaching station and a loading station to remove from successive pallets generally designated 10, the lasts L and completed shoes which have just had their outsoles attached and then reload each pallet with the next shoe to be bottomed by the rink. The last-carrying pallets are normally equally spaced and moved at a constant velocity to and through all of a series of stations, except the spotting and attaching station wherein their movement is intermittent, to present the shoes bottoms-up to various operating means hereinafter to be described, the shoes being treated simultaneously at the respective stations. To facilitate the addition or removal of stations the conveyor is preferably of modular construction, each frame unit being aligned and comprising a pair of parallel rails 12, 14 (FIGS. 4, 6 and 7) on which the pallets slide continuously to carry the shoes heel-first. The rail 12 is grooved to receive an endless drive chain 16 (FIGS. 4 and 14) one side down, and rolls 18 mounted on the chain with a spacing corresponding to that of the pallets also run in the rail groove. The rolls 18 are disposed respectively for driving engagement with one of a pair of rolls 20, 20 (FIGS. 4 and 5) on each pallet and also received in the rail groove. At each end of the rink the chain 16 runs on a sprocket 22 (FIG. 1), one sprocket being continuously driven by a reduction-geared motor 24 (FIGS. 1 and 48), and is adjustable to take up any chain slack.

Referring particularly to FIGS. 2 through 7, the detachable pallets 10 each include a frame portion 26 (FIGS. 2 and 6), and a toe post 28 (FIGS. 2, 5 and 7) and a heel post 30 (FIGS. 2, 5 and 6) respectively mounted for vertical sliding movement. The heel post is thus movable in a bore formed in the portion 26 and the toe post is mounted in a longitudinally adjustable holder 29 (FIGS. 4 and 7) slidable on horizontal guides 31 on the frame portion to accommodate different sizes of shoes. For locking the toe post in a selected lengthwise position, a spring-pressed detent 33 pivotal on the holder 29 is biased to latch with any one of a series of notches formed in one of the guides 31. On its upper end the heel post 30 pivotally carries on a fulcrum pin 32, a lever 34 mounting a jack pin 36 (FIGS. 2, 5 and 6) shaped to be received in the thimble hole of the last. For normally urging the forepart of the shoe down against a toe pad 38 on the toe post 28, a torsion spring 40 (FIGS. 5 and 6) supported by the portion 26 has one end anchored therein and its other end is secured in a lever 42 for biasing the latter counterclockwise as viewed in FIG. 5, the lever 42 having pin-and-slot connection with one end of a link 44 pivotally connected at its other end to the lever 34. The heightwise position of the heel post 30 is at times determined by a roll 46 carried in its lower end and arranged to cooperate with fixed cams mentioned later, and in like manner the heightwise position of the toe post 28 is at times determined by a roll 48 carried by its lower end and cooperative with fixed cams.

As indicated by the left-hand pallet 10 in FIG. 2 (which is about to be loaded), in arriving from the spotting and attaching station the rolls 46, 48 respectively, ride on parallel, laterally offset, horizontal tracks 50, 51 fixed on a table 53 adjustable heightwise by means later explained, and a last pin operating roll 52 (FIGS. 3 and 5) carried at the lower end of the link 44 engages and is raised by a fixed cam 54 also fast on the table 53 which thus causes the last pin to tilt clockwise to relieve clamping pressure on the shoe and permit its removal prior to reloading. In thus actuating the last pin, pawl and ratchet mechanisms, now to be explained, which normally hold the toe and heel posts against downward movement, are released to allow both posts to assume their highest positions. A ratchet 56 (FIG. 6) formed on the heel post 30 is arranged to be engaged by a spring-pressed pawl 58 pivotally secured to the frame portion 26. In like manner a ratchet 60 (FIG. 7) formed on the toe post 28 is arranged to be engaged by a spring-pressed pawl 62 pivotally secured to the holder 29. The posts 28, 30 are held against turning about vertical axes by keys 64, respectively.

Figure 1:
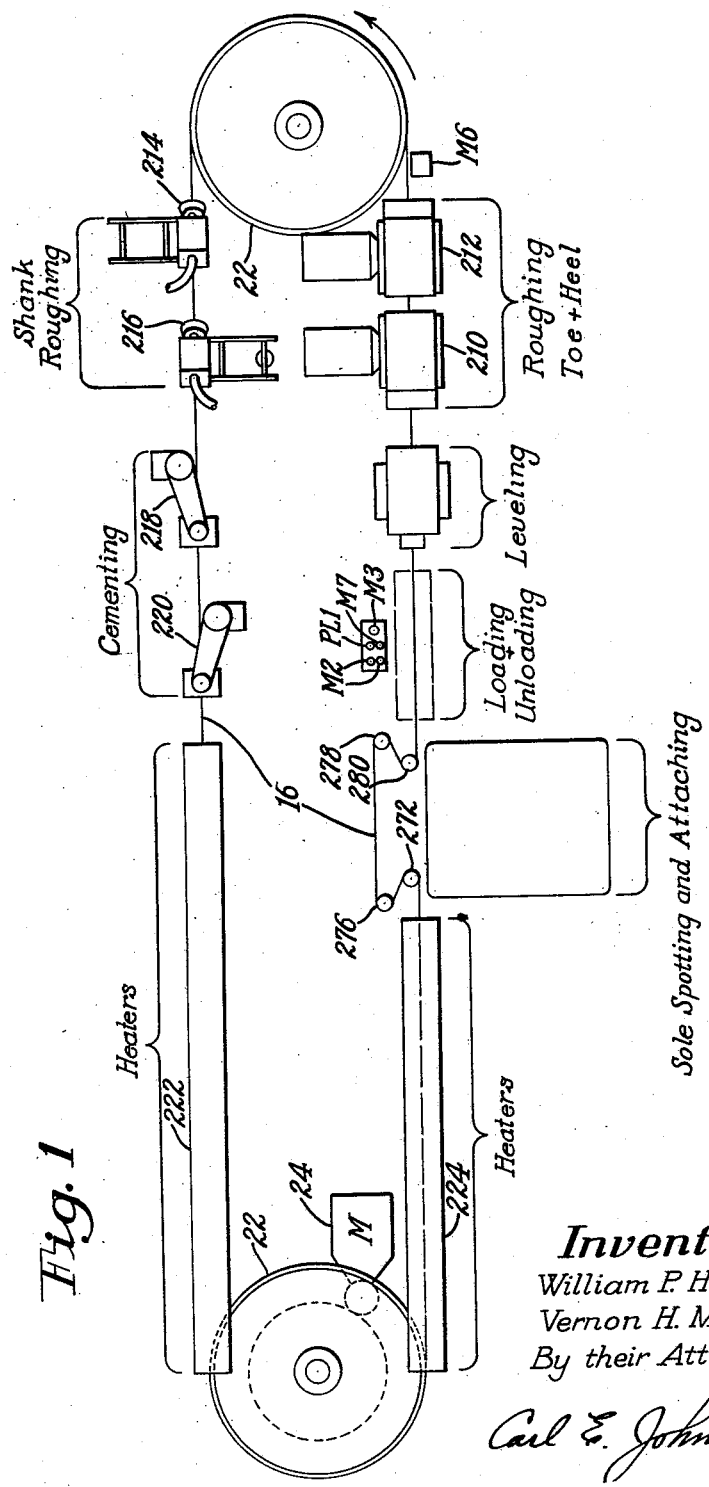
FIG. 1 is a schematic plan view of a slip-lasted shoe-bottoming system or rink.
Figure 5:
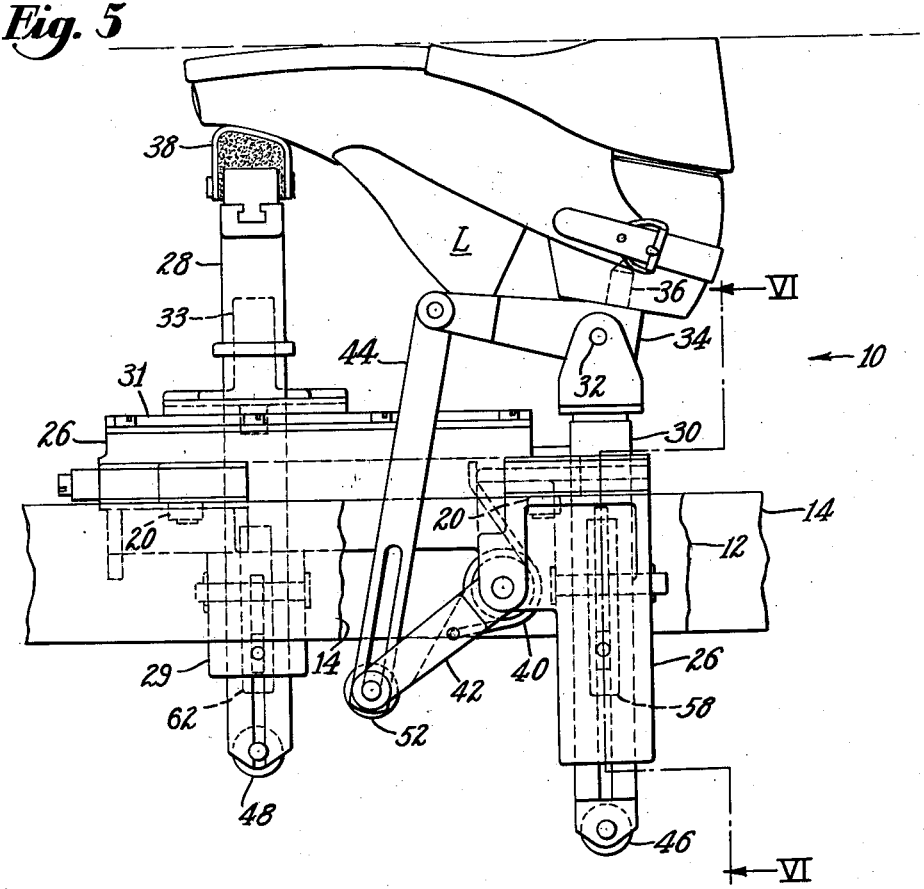
FIG. 5 is a view in side elevation largely corresponding to FIG. 3, but the shoe being shown in a different position.
Figure 48:
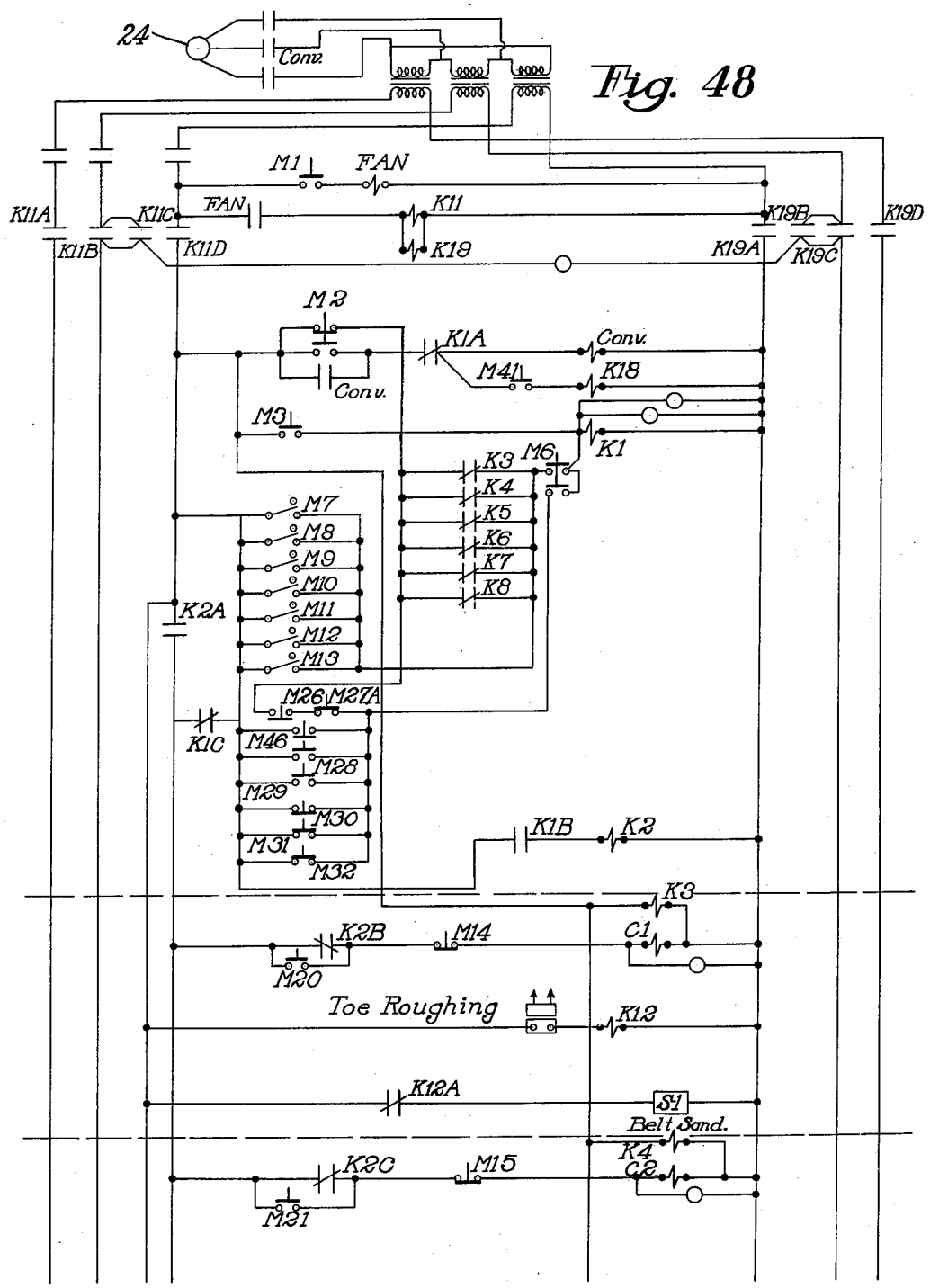
FIGS. 48 through 50 inclusive, are complemental wiring diagrams of the electrical controls of the bottoming rink.

It should be noted (FIG. 1) that primary electrical controls such as conveyor starting and emergency stop switches for the system, included diagrammatically in FIGS. 1 and 48 and to be subsequently described more fully, are preferably disposed on a control stand within reach of the operator unloading and reloading the successive pallets 10. When a completed shoe has been unloaded with its last from a pallet and the latter has reached a position shown in FIG. 3, which is between the unloading and leveling stations shown in FIGS. 1 and 2, a new shoe to be bottomed is manually pressed downwardly with its last upon the jack pin until the forepart engages the toe pad 38, as shown in FIG. 5. The heel post 30 is thus somewhat lowered to bring the shoe bottom into substantially horizontal position and to insure that the heel end, regardless of the type of shoe construction, is positioned low enough to be received in the levelling station. This depression of the posts is permitted since a bar 66 (FIG. 4) secured to the rail 12 has a cam 68 disposed to engage and thus unlatch successively the pawls 58, 62. The level of the toe pad will be maintained by the track 51 while the roll 46 moves over and is yieldingly supported heightwise by a track 70 (FIGS. 2 and 3) extending horizontally and alined to the track 51. The track 70 is carried by a pair of parallel, horizontal arms 72, 74 (FIG. 9a) fulcrumed at one end to pins 76, 78, respectively, journaled in the table 53, and a coil spring 80 (FIG. 3) on the pin 76, having one end abutting the table, has its other end bearing upwardly on the track 70. Depression of the track 70 during loading is dampened by a piston-cylinder device 82, the cylinder being affixed to the arm 72 and its rod 84 secured to the table 53. In order to lock the track 70 in its appropriate heightwise position thus to determine the level of the shoe bottom for its entry into the leveling station, the inner end of the arm 74 is formed with ratchet teeth 86 for cooperating with staggered teeth of a spring-pressed pawl 88. In order thereafter to unlatch the pawl 88 in preparation for the following pallet, a cam plate 90 (FIGS. 2 and 3) is pivotally secured to the table 53 and is arranged to be actuated by a dog 92 (FIGS. 6 and 7) of the pallet 10 about to enter the levelling station. After the heel post roll 46 has engaged and been depressed with the track 70, the roll 52 under the influence of the spring 40 moves past its cam 54 and onto a damper track 94 of a bell crank lever 96, the roll 52 now descending on the track due to the spring 40 to clamp the shoe on the jack, the track 94 normally being urged upwardly by a tension spring 98 (FIGS. 2 and 3) and resisting depression by means of a damper cylinder 100.

The table 53 requires adjustment heightwise only when there is considerable change in toe height, due for instance to variations in toe spring and sole thickness in different types of shoe construction. In order to provide a suitable range of heightwise adjustment the base of the table 53 is threadedly mounted on four upright studs 102 (two shown in FIG. 2) rotatable about vertical axes in the conveyor frame. Rotation of one of the studs 102 by means of its knurled head 104 is transmitted to the other studs 102 by a chain 106 and its sprockets on respective studs, thereby establishing heightwise a range of operating levels as selected. The pallet post pawls 58, 62 have been maintained in unlatched position by the bar 66 throughout the shoe loading interval, but just ahead of the leveling station the bar 66 is formed with a cam 108 (FIG. 4) arranged to permit latching of the pawl 58 and hence relocking of the heel post 30 against downward movement.

*Leveling Station*

Figure 2:
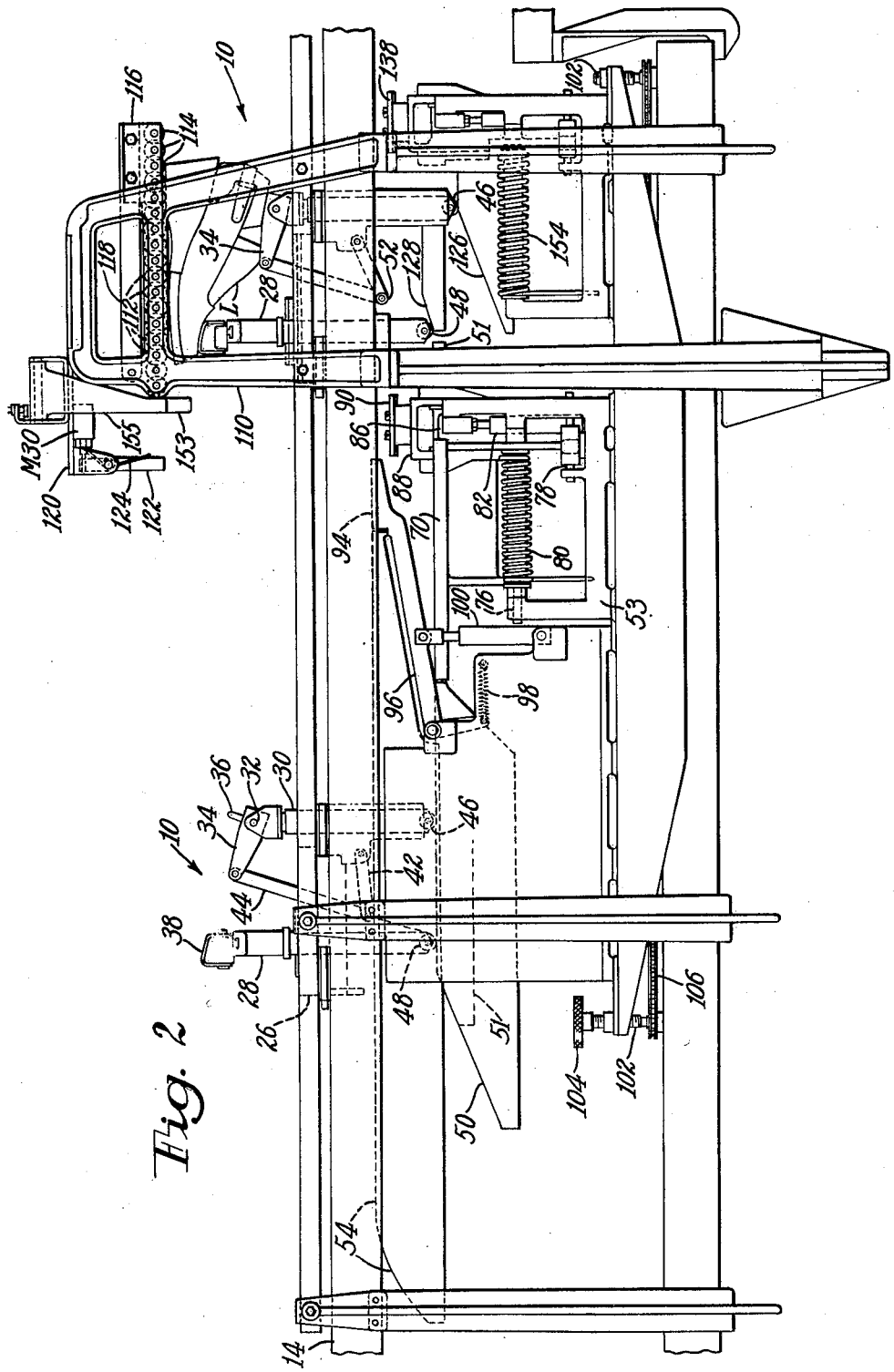
FIG. 2 is a view in side elevation of the unloading and loading stations, and a leveling station having a shoe thereat.
Figure 3:
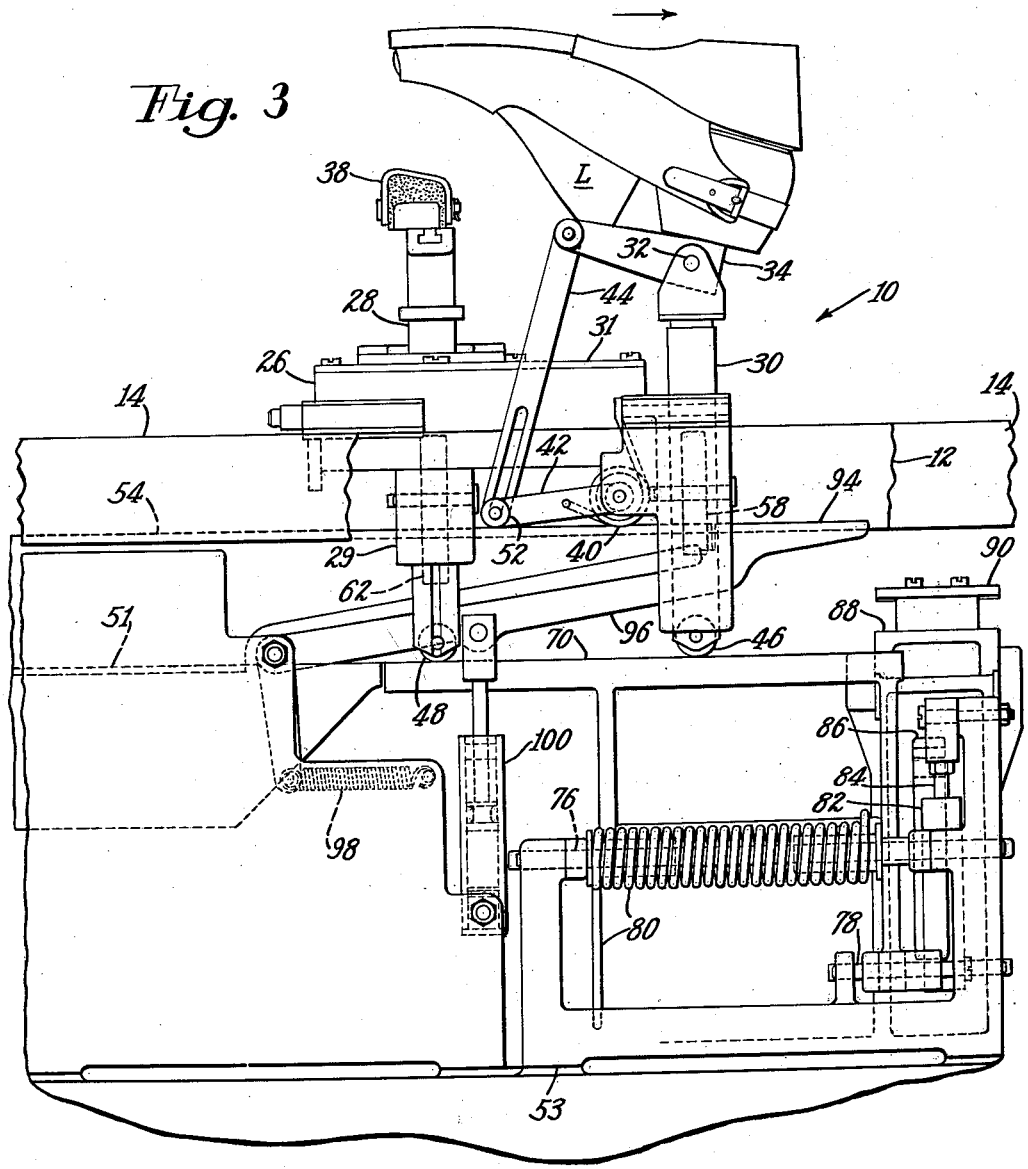
FIG. 3 is a view in side elevation of a last-carrying pallet in one position on the pallet conveyor.
Figure 10:
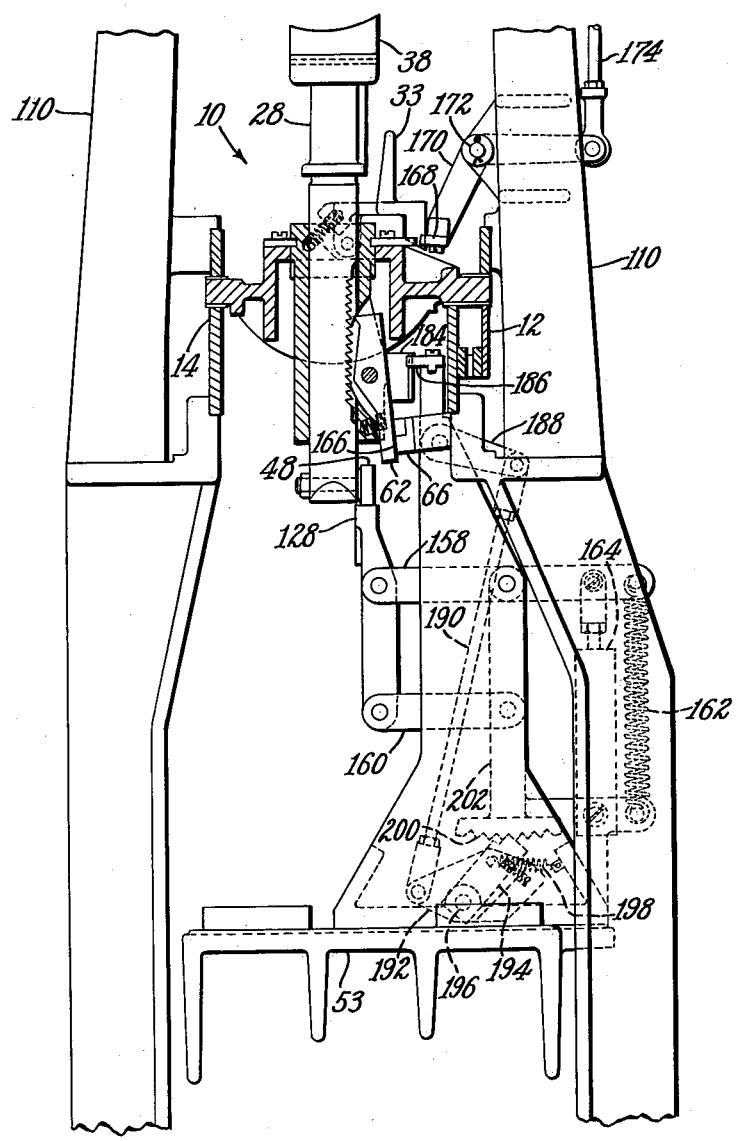
FIG. 10 is a fragmentary end view of the leveling station, certain parts associated with the toe post being shown in section, the parts being shown as seen when looking toewardly from the heel end.
Figure 11:
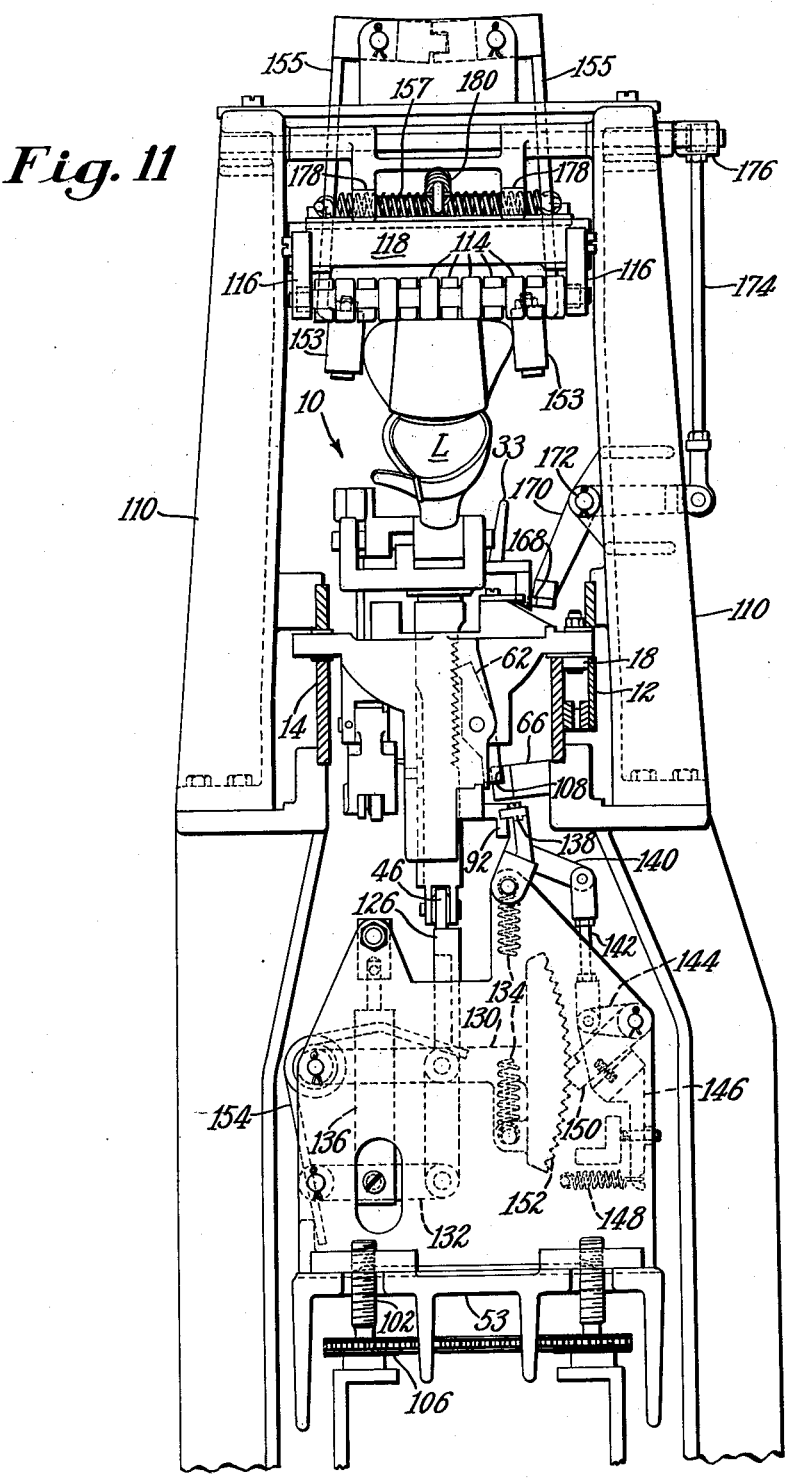
FIG. 11 is an end view as seen from the right hand end of FIG. 9.
Figure 19:
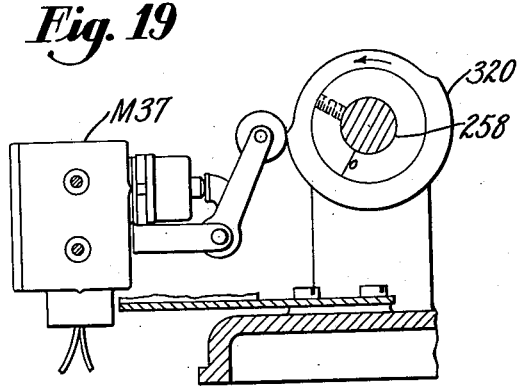
FIGS. 19 through 22 are, respectively, sections taken on the lines XIX through XXII in FIG. 18.
Figure 20:
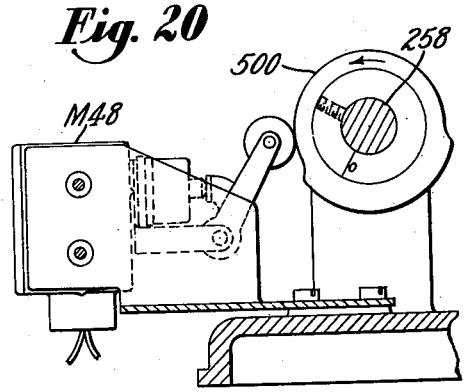
Figure 21:
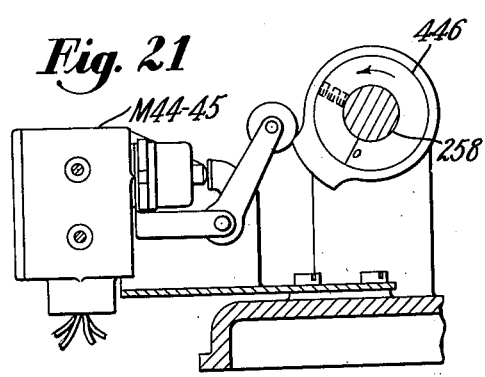
Figure 22:
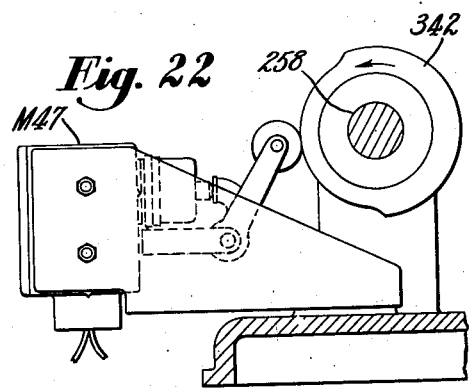

Referring now more particularly to the right-hand portion of FIG. 2 and FIGS. 8–11, the newly loaded shoe having its bottom in substantially horizontal position passes to the bottom leveling station. Here the function is fixedly to position the shoe bottom horizontally and heightwise for all subsequent stations. A pair of upright yokes 110 secured one on each side of the conveyor frame rotatably support a plurality of bottom engaging rolls 112 all of which, together with an end section of five rolls 114, are thus normally mounted as an abutment in a fixed horizontal plane. The rolls 114 are movable upwardly automatically from this plane for a purpose and by means later to be described, being journaled in plates 116 carried at one end of a lever 118 pivoted at its other end to the yokes 110. In order to guard against any possibility of a shoe being introduced to the rolls 112 at too high a level a bracket 120 (FIGS. 2 and 8) on the yokes pivotally supports a vertical switch actuating lever 122 normally held in inoperative position by a spring 124. The lower end of the lever 122 is so disposed that on being deflected (counterclockwise as seen in FIGS. 8 and 9) by an insufficiently depressed shoe a normally closed safety switch M30 (FIGS. 8 and 48) is opened immediately to stop operation of the conveyor. For elevating the depressed shoe bottom into leveling position the heel post roll 46 (FIGS. 9 and 11) next rides up on a cam 126 (FIGS. 2 and 9), and the toe post roll 48 rides up on a cam 128 (FIGS. 2 and 8), these cams being mounted as will next be explained and yieldingly urged upwardly to the extent permitted by engagement of the shoe bottom with the leveling rolls. The cam 126 is carried by a locking lever 130 (FIG. 11) and a link 132 parallel thereto, corresponding ends of the lever and link being pivoted to the table 53, and the lever 130 being suspended by a spring 134. For dampening the action of this spring a snubber cylinder 136 (FIG. 11) is secured to the link 132 and has a piston connected at its upper end to the table 53. The heel end of the shoe bottom is thus raised and urged initially against the rolls 112 and thereafter against the rolls 114, the toe post roll 48 traveling over the track 51 and onto the cam 128. When the heel post 30 is elevated nearly to its highest position the dog 92 pivots a cam 138 (FIG. 11) carried by a bell crank lever 140 (clockwise as seen in FIG. 11) fulcrumed on the table 53. Accordingly a link 142 connecting the lever 140 and an operating arm 144 of a lever 146 is effective, against the resistance of a return spring 148, to disengage a spring-pressed latch arm of the lever 146 from a ratchet 152 arcuately formed on the locking lever 130 and thus allows the cam 126, under the influence of the spring 134, to force the heel bottom upwardly against the rolls 112, 114. Now, as the roll 46 traverses the horizontal portion of the cam 126, the latch 58 locks the heel post in proper heightwise position for the remainder of the travel of a particular shoe. A face of the cam 138 thereafter permits the spring 148 to reengage the latch arm 150 with the ratchet 152 in preparation for the next pallet, the ratchet 152 and its lever 130 having been lowered to its initial position by a torsion spring 154 (FIGS. 2, 9 and 11). The spring 134 being much stronger than the spring 154, the piston-cylinder snubber 136 (FIG. 11) preferably connects the link 132 and the table 53 to dampen heightwise movements of the cam 126. In order to insure centralizing of the successive shoes widthwise of their pallets 10, a pair of transversely spaced rolls 153, 153 (FIGS. 10 and 11) is carried on the respective lower ends of pivotally supported levers 155, 155 the upper arms of which mesh, the rolls 153 being urged together and into shoe-engaging position by a tension spring 157 interconnecting the levers 155.

As indicated in FIG. 8, as the heel end traverses the rolls 114, mechanism corresponding to that just described is provided for lifting the toe post 28 and hence moving the bottom of the forepart into roll-engaging position. Thus the cam 128 is suspended as shown in FIGS. 8 and 10 by corresponding ends respectively of a lever 158 and a link 160 parallel thereto, this lever and link being pivotally carried by the table 53, and a tension spring 162 connecting the latter and the lever 158 to urge the cam 128 upwardly. A piston-cylinder snubber 164 is arranged to dampen such movement of the cam 128 while it is being engaged by the roll 48. As the latter rides up and onto the horizontal upper level of the cam 128 it is to be noted that the toe post latch 62 continues to be held disengaged, its lower end being engaged, at this time by a flat 166 (FIGS. 4 and 10) of the bar 66 for this purpose. This enables the toe end of the shoe bottom to be somewhat raised to engage the first leveling roll 112 beyond the rolls 114 as the ball portion (higher than the toe end due to toe spring) of the shoe bottom passes the rolls 114 which are thereupon lifted automatically, by means about to be explained, to permit this toe end positioning. The arrangement accordingly is advantageously such that each shoe is predeterminedly leveled into a position wherein the ball portion is higher than the ends of the shoe which are on the same level, but is only as much above the level of the ends of the shoe as the low point (for instance in the scooped portion of a platform type shoe) is below this level. For elevating the rolls 114 at the proper time a cam 168 (FIGS. 8, 10 and 11) formed on the lower end of a lever 170 pivoted at 172 to one of the yokes 110 is disposed to be engaged by a depending portion of the detent 33. Thus, on deflecting the lever 170 counterclockwise (as viewed in FIGS. 10 and 11), a link 174 connecting it to one arm of a bell crank lever 176 pivotally mounted on the upper arm of the yoke is effective to swing the other arm of the lever with a pair of spaced latch blocks 178, 178 (FIGS. 8 and 10) secured on the lever 118. A tension spring 180 connecting the yoke to the lever 118 then raises the latter counterclockwise as shown in FIG. 8 to elevate the rolls 114 until the toe end has passed whereupon they, under the influence of gravity, the detent 33 having passed the cam 168, resume their normal locked coplanar relation with the rolls 112.

Since the toe end of the shoe is properly positioned as just described, the toe post pawl 62 is permitted by a cam 182 (FIG. 4) formed on the bar 66 to lock the toe post 28 in its adjusted heightwise position. Previous to this, of course, the cam 128 has been held against excessive downward movement, and then in the interval when a toe end roll 48 is traversing the highest horizontal portion of the cam 128, the spring 162 is allowed to maintain the forepart against the rolls 112. To these ends a dog 184 (FIGS. 8 and 10) formed on the pallet 10 is arranged to pivot (clockwise as seen in FIG. 10) a cam 186 secured on a lever 188 pivotally mounted on the table 53. Resultant downward movement of a link 190 connected to the lever 188 urges a holder 192 for a spring-pressed latch 194 to move counterclockwise (as seen in FIG. 10) about its fulcrum 196 in the table and against the resistance of a return spring 198. Consequently the latch 194 is urged to lock with arcuately disposed ratchet teeth 200 formed on a vertical arm 202 of the lever 158 to maintain the cam 128 against depression until the toe post passes the rolls 112 and is locked as just explained whereupon the spring 198 is permitted by the dog 184 to disengage the latch 194.

*Roughing and Cementing Stations*

Figure 49:
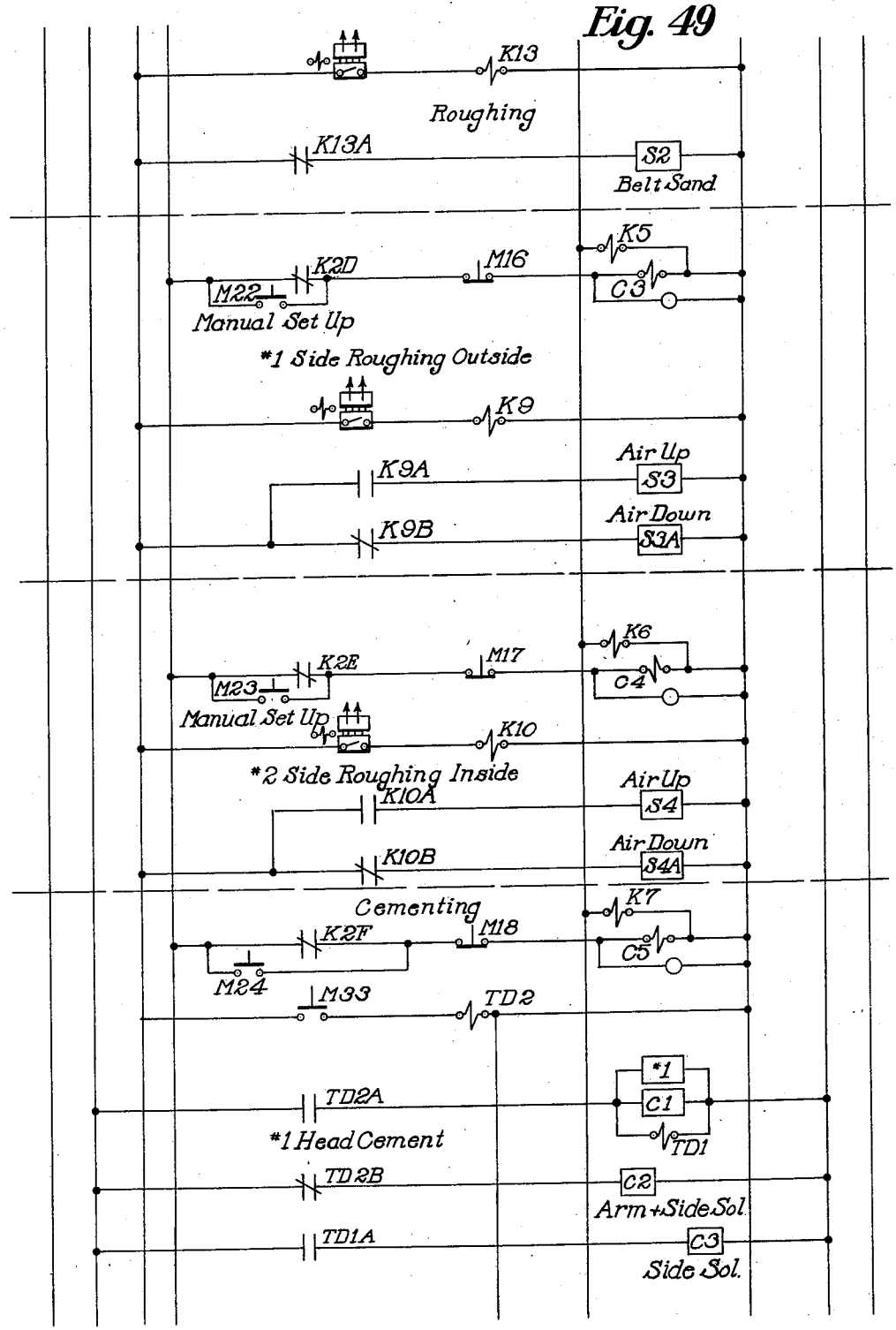

Upon leaving the leveling station, each pallet 10 presents its shoe with its bottom continuously locked in proper elevation and lateral position for the action of suitable roughing instrumentalities. As indicated in FIG. 1, and fully disclosed in the copending application 172,013 above referred to, these instrumentalities may include in successive stations 210, 212, 214 and 216 (FIG. 1), for instance, an endless toe roughing belt, a similar heel roughing belt, a left shank roughing wheel, and a similar right shank roughing wheel. It will suffice here to state that these tools together, because of the predetermined location of the successive shoe bottoms, are enabled without operator attendance or change of pace completely and uniformly to rough their overlasted margins in preparation for reception of adhesive with which the soles ultimately to be attached will be secured. Similarly, at like cementing stations 218, 220 only indicated in FIG. 1 but fully disclosed in the copending application 172,013 referred to above, the right and left sides of the margins are suitably cemented, whereupon they successively are conveyed through suitable heat activating ovens or stations 222, 224 shown diagrammatically in FIG. 1. Since the electrical controls for all of these stations are closely associated with those of the conveyor and the sole spotting and attaching station, they are shown together in FIGS. 48-50.

*Spotting and Attaching Station*

Figure 50:
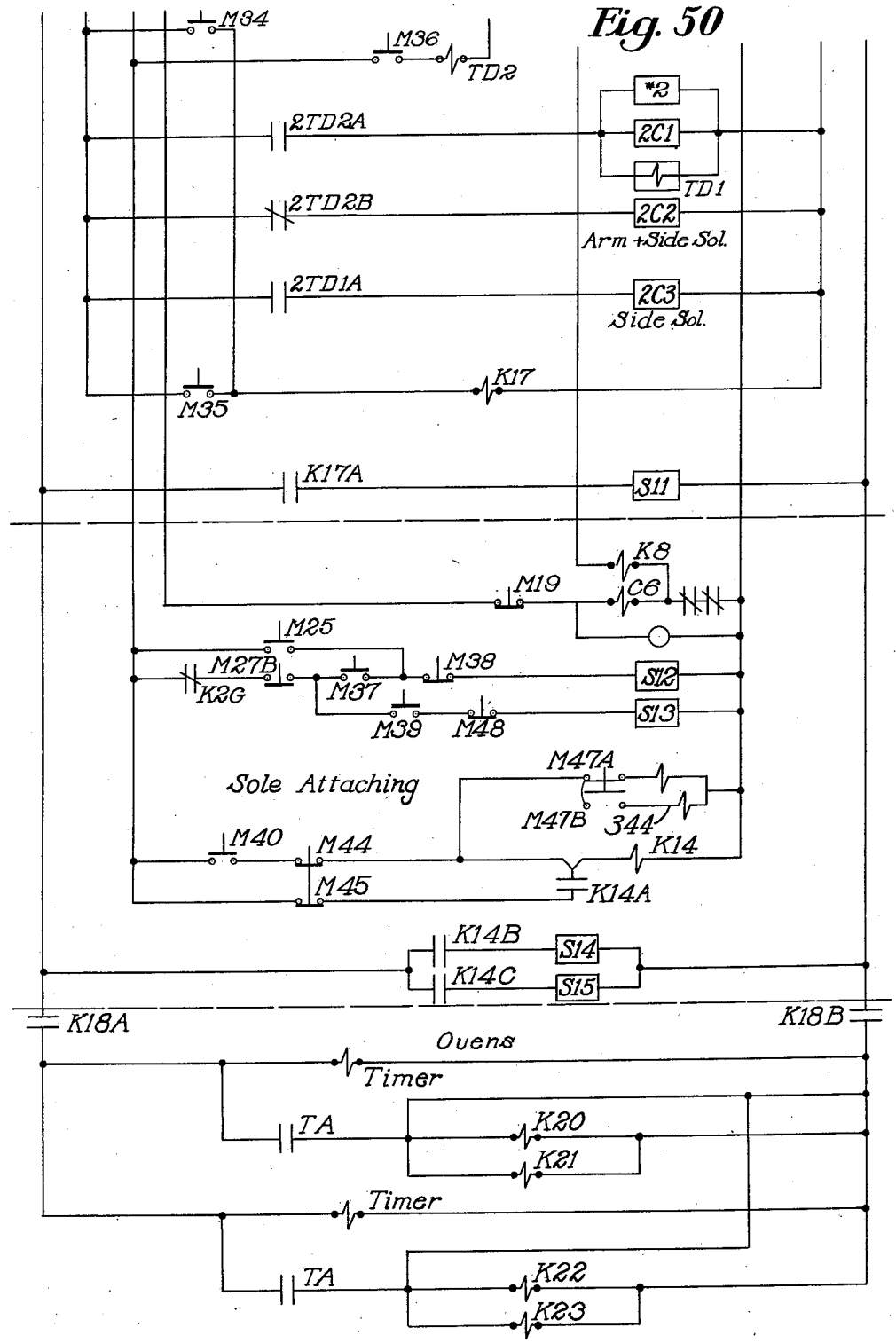

Now the shoes having bottoms prepared to receive their respective outsoles are fed by the conveyor to the spotting and attaching station (FIGS. 12-47 inclusive). As will be described the successive pallets 10 are here temporarily disassociated from the drive chain 16 which is directed rearwardly around this station as shown in FIG. 15. The station is herein illustrated as including a scoop gaging zone, an auxiliary pallet or shoe transfer and indexing means, a sole conveyor indexing means generally designated 226 (FIGS. 12, 13 and 39), and a fluid pressure operated sole pressing machine 228. To present its shoe for receiving a sole 230, each pallet must be brought to a stop, and the scoop portion (usually termed simply "scoop") of each shoe bottom must then dwell in register with the corresponding portion of a vertically reciprocable presser 232 (FIGS. 16, 17 and 45) of the machine 228. Since the scoop on shoes of different sizes and styles may be spaced different distances from the thimble of their lasts, provision is made for locating the position of a particular scoop with respect to the center line of the scoop portion of the presser. To this end, as the chain feeds the shoe into the scoop gaging zone, a square sectioned projection 233 on the trailing end of its pallet is engaging a longitudinally yieldable pawl 231 (FIG. 16) of a pallet locking slide 234 (FIGS. 16, 17, 19 and 45) to advance the slide lengthwise along the conveyor frame against the resistance of a return spring 235 (FIG. 16). This locking slide is slotted longitudinally to receive guide lugs of a conveyor rail and is temporarily locked to the frame by electrical means to be explained upon the shoe scoop being centralized under a pair of bottom gaging rolls 236, 236 (FIGS. 14, 16, 17 and 46) constituting part of a switch M40 (FIGS. 46 and 50) bracketed to the frame. The mounting of the rolls is such that they are initially lifted by engagement of the shoe with a cam 237 and are individually spring-urged downwardly against the progressing shoe bottom, but cannot close corresponding switch contacts effectively to actuate the switch M40 until both rolls have come to the same lower level, i.e. when the shoe scoop has been centralized lengthwise with respect to the switch. Actuation of the switch energizes a relay K14 through normally closed relay switches M44, M45 (FIGS. 46 and 50). The relay K14 closes contacts K14A, K14B and K14C, and energizes a solenoid S14 (FIGS. 12, 14 and 46), its plunger 238 acting, against a return spring, through a link 240 to cause the toothed end of a bell crank lever 242 to mesh with and hold the slide 234 locked in proper position against the frame. The relay K14 is simultaneously effective to energize a later mentioned solenoid S15 (FIGS. 18, 25, 46 and 50) for causing operation of the sole conveyor indexing means 226.

Figure 45:
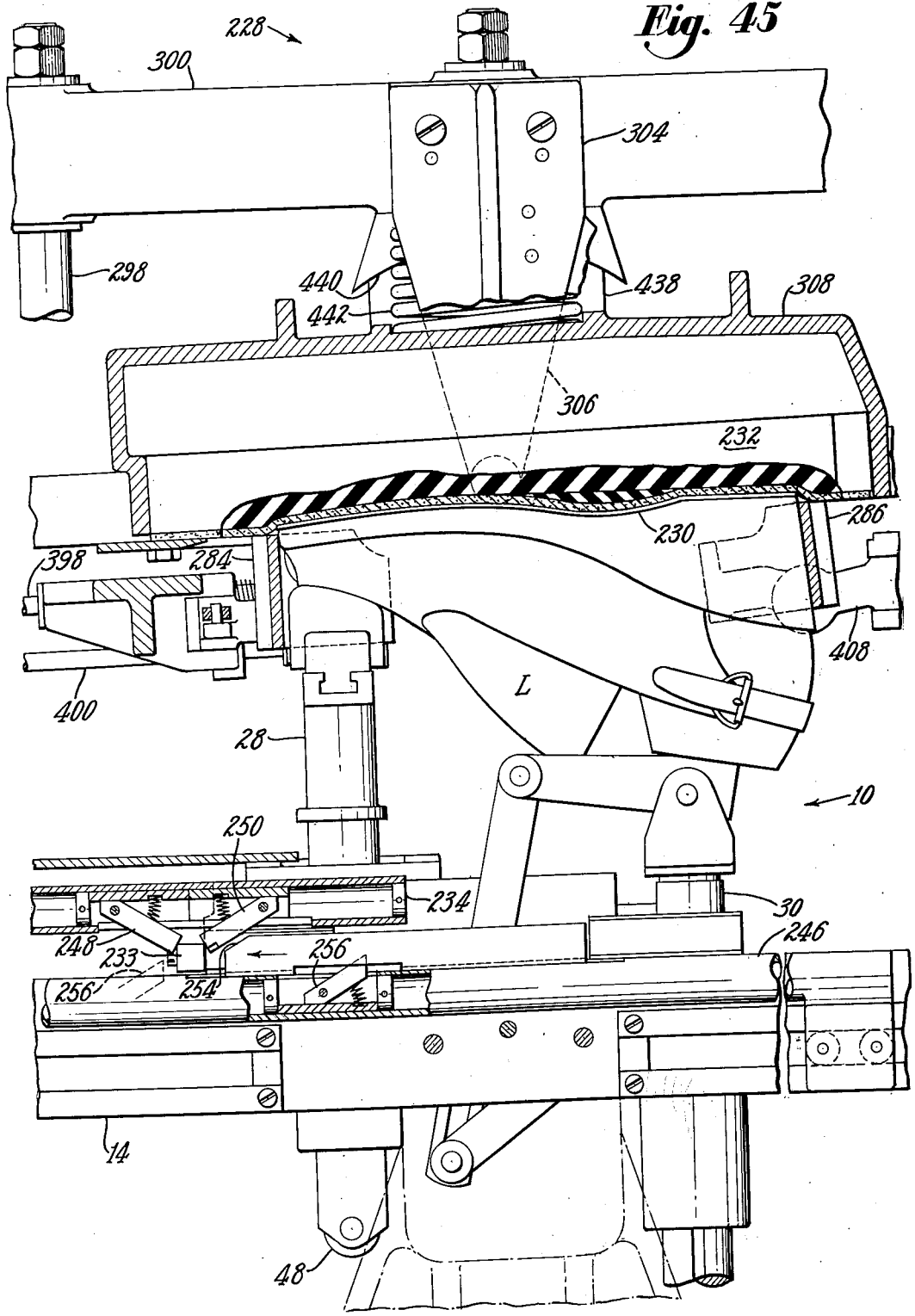
FIG. 45 is a view corresponding to FIG. 44, but showing the parts at a subsequent stage of operation.
Figure 46:
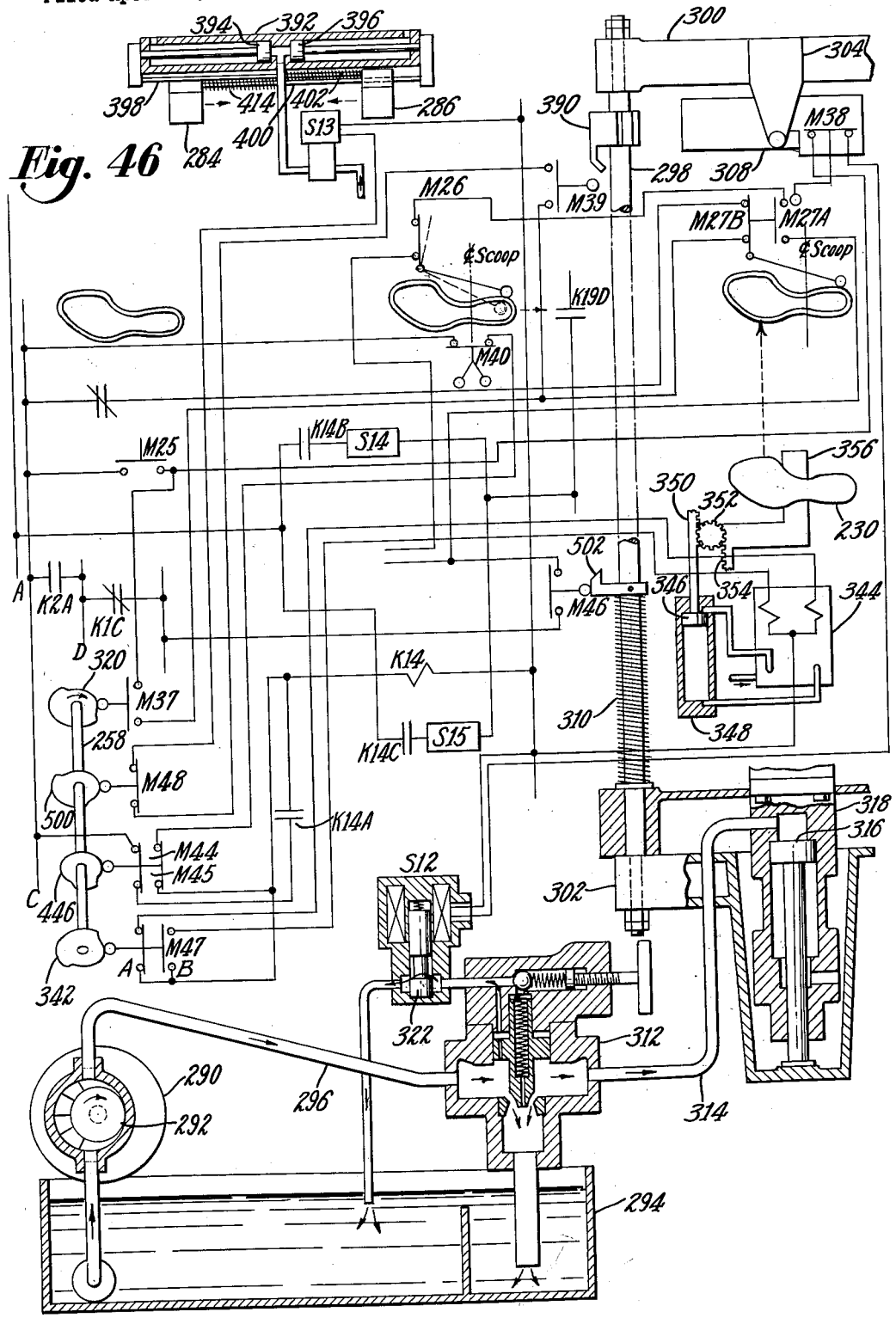
FIG. 46 is a schematic diagram of the electrical, hydraulic and pneumatic means for controlling the spotting and attaching station.
Figure 47:
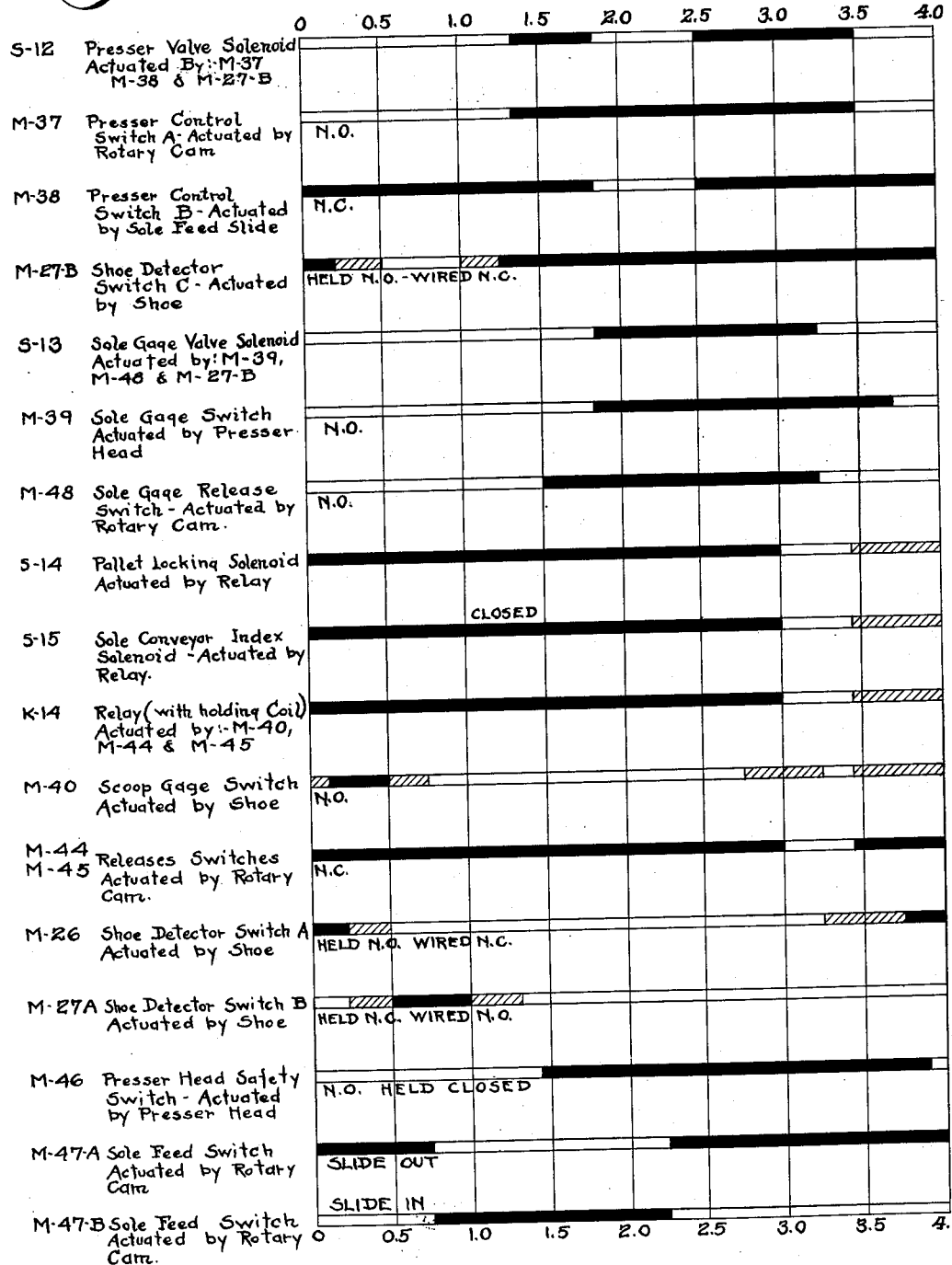
FIG. 47 is a timing chart of the control system for the sole spotting and attaching station.

The projection 233 of that pallet 10 which has just had its shoe bottom gaged as explained is now engaged by a pivotal, yieldable driving dog 244 (FIG. 16) of a horizontally reciprocating transfer slide 246 (FIGS. 16, 17 and 45) and hence advanced, by timing and operating means to be described, until the projection 233 of the pallet is received between oppositely spring-biased detents 248, 250 (FIGS. 16 and 45) pivoted to and projecting from the now stationary locking slide 234 thus determining the sole-receiving position as shown in FIG. 45. To permit continued movement of the slide 246 to the right as viewed in FIG. 16 to eject a preceding pallet from sole receiving position as the previously mentioned pallet is fed to its sole receiving position, and ear 252 (FIGS. 15 and 16) formed on the conveyor frame is effective to lift and disengage the pawl 231 from the projection 233. A cam surface 254 (FIG. 16) on the transfer slide is arranged to elevate the detent 250 during the retractive stroke of the slide 246 thus to release the pallet from its dwell or sole-receiving position after sole attachment is completed whereupon, in the next feed stroke of the pallet transfer slide, its pivotal pawl 256 (FIGS. 16 and 45) will engage the projection 233 to advance the pallet from sole attaching position to the zone wherein it is reengaged by the roll 18 of the drive chain 16. As will be understood from the foregoing the pallet locking slide 234 in becoming locked has, in effect, measured off a distance between the approaching projection 233 and the notch formed by the pallet locking detents 248, 250 which is equal to the distance between the center line of the scoop gage rolls 236 and the center line of the pad box scoop, and the transfer slide thereupon feeds one pallet the corresponding distance required to register the shoe scoop thereon with the pad box scoop 232 and simultaneously advances the preceding pallet from sole attaching position.

Figure 23:
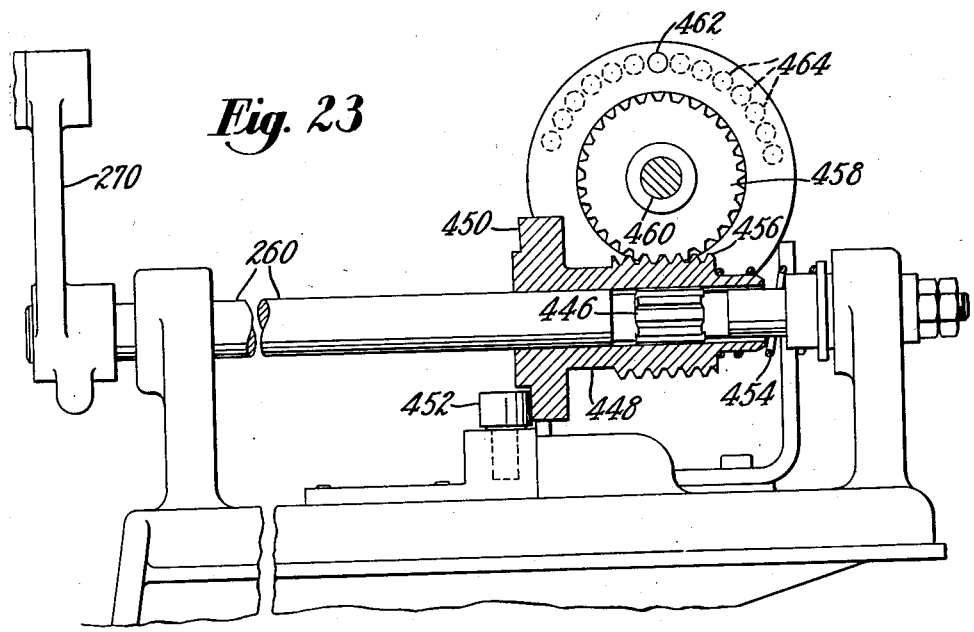
FIG. 23 is a view in rear elevation, partly in section of mechanism shown in FIG. 18.
Figure 24:
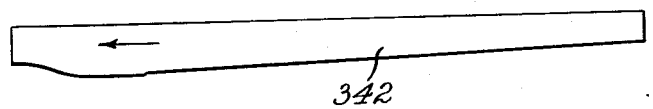
FIG. 24 is a development of a cam indicated in FIG. 22.

As will next be explained the operation of the pallet transfer slide 246 is coordinated with that of the sole indexing means 226 and the sole pressing machine 228 as well as the conveyor driving chain 16. Referring to FIGS. 18, 23 and 46, the slide 246 is operatively connected to a two-part, coaxial control shaft 258, 260. For this purpose a link 262 (FIG. 12) interconnects one end of the slide 246 with the upper end of a lever 264. The lower end of the latter is fulcrumed at 266 on the conveyor frame and the lever has a mid portion connected by means of a link 268 (FIGS. 12, 18 and 23) to a pair of parallel crank arms 270, 270 clamped to adjacent ends of the respective shaft parts 258, 260. This two-part shaft derives its motion from the chain 16 by means of a sprocket 272 (FIG. 14) arranged to divert the chain from the path of the pallets. The sprocket is fast on the upper end of a vertical shaft 274 (FIGS. 12, 14 and 18) having a miter gear coupling to the shaft 258. As indicated in FIG. 1, on leaving the sprocket 272 the chain 16 passes successively in a loop around spaced sprockets 276, 278 and 280 to return to the normal conveyor path. The distance between the sprockets 272 and 280 is critical in that it must enable each constant speed drive roll 18 again to come between a pair of rolls 20, 20 and continue movement of their pallet, now bearing its sole attached shoe to the unloading zone. In the illustrative machine the rolls 20, 20 of a pair are spaced about 14″ apart, and the intermittent feed stroke imparted to the slide 246 must be adequate to transfer a shoe into the spotting and attaching machine as the preceding shoe is being removed from the machine. Thus, while shoes are being presented by the main conveyor with constant velocity to and through the leveling, roughing and cementing stations, for instance, the described auxiliary conveying means is effective at the same operating frequency to carry a shoe to the spotting and attaching station, allow a dwell therein, and then carry it away from this station. The linkage arrangement is such that shoe feeding takes about one-third of the cycle time (about four seconds), and the return stroke occupies approximately two-thirds of the cycle time. It is during this return stroke that sole spotting and attaching is performed as will be explained.

As a shoe is fed into the attaching position it engages and displaces a feeler roll 282 to close a shoe detector switch M27B (FIGS. 14, 18, 28, 46 and 50) and permits actuation of the presser head of the machine 228 and of its centralizing toe and heel sole gages 284, 286 respectively (FIGS. 14, 37, 38, 40 and 45). If no shoe be carried by a pallet, the presser head and sole gages cannot operate. Cam control mechanism on the shaft portion 258 is arranged as later explained to actuate in proper sequence air-operated means for operating the sole centralizing gages and a hydraulic system for operating the sole pressing machine 228. The latter comprises a base 288 (FIGS. 13, 18, 28–31 and 46) housing the just mentioned hydraulic system including a motor 290 (FIGS. 29–31), and a pump 292 coupled thereto for supplying fluid such as oil under pressure from a sump 294 via a pipe 296. The base is formed with triangularly spaced vertical bores slidingly receiving head-operating rods 298, respectively, which are bolted to an upper cross head 300 and to a lower cross head 302. Secured to the upper cross head is a pair of brackets 304, 306 affording trunnion support for a pad box 308 (FIGS. 13, 28, 37 and 39) carrying the presser 232 which is formed to attach the soles 230 successively to be presented. Downward movement of the presser 232 into operating position is effected against the resistance of return springs 310 on the rods 298, respectively, by the admission of fluid under pressure from the pipe 296, via a pressure relief valve 312 (FIGS. 29 and 46) and a conduit 314 to the upper end of a dual acting piston 316 (FIGS. 30 and 46) vertically reciprocable in a cylinder 318 adjacent to the base 288. For this purpose the lower end of the piston is secured to the cross head 302. A cam 320 (FIGS. 18, 19 and 46) on the shaft 258 at the proper instant closes a presser control switch M37 to energize a solenoid S12 (FIGS. 29, 46, 47 and 50) through a normally closed presser control switch M38 (FIGS. 44 and 46) and the closed contacts of the shoe detector switch M27B. The solenoid S12 thereupon closes a venting port 322 (FIG. 46) to pressurize the system. The consequent admission of fluid to the upper end of the cylinder 318 causes the pad box 308 to be lowered until the gages 284, 286 are in gaging position.

As has been noted above and will subsequently be explained, during approach of the shoe to the spotting and attaching station the energized solenoid S15 (FIGS. 18, 27 and 46) has caused the sole conveyor indexing means 226 to operate. While this sole indexing means 226 may take any appropriate form, or even be entirely supplanted by an operator if desired, the illustrated means herein shown for automatically presenting successive soles 230 comprises a pair of vertically disposed endless chains 324, 324 (FIGS. 12, 13, 39–43) respectively carrying evenly spaced, bent wire sole carrying clips 326. As indicated in FIG. 42, for example, each sole is engaged in its forepart by one clip and in its heel portion by another clip at the same level. As shown in FIG. 39, in the descending portions of the chains 324 adjacent to the spotting and attaching station, flat portions of cooperating clips horizontally support a sole, and resilient, inwardly turned portions 328 of these clamps bear on a preceding sole to urge its retention. Soles are normally loaded between successive pairs of clips as they rise to about waist level, and right and left soles are customarily loaded alternately. As indicated in FIGS. 39 and 41–43, a toe gage 329 may be adjustably prepositioned at the loading zone to assist in the positioning of soles lengthwise to correspond with the order and size of the shoes to be bottomed. For supporting the chains 324, 324 in parallel triangular formation, pairs of spaced sprockets 330, 330, 332, 332 are journaled in a fabricated frame 336 (FIGS. 12, 13 and 18) and driving sprockets 334, 334 are secured on a cross shaft 338 journaled in the frame. This cross shaft is operatively connected to the shaft 260 through mechanism including the solenoid S15 for indexing the sole conveyor as hereinafter described. Also during approach of the shoe to the spotting and attaching station, as the solenoid S15 is energized for indexing the sole to be attached, a cam 342 (FIGS. 18, 22 and 46) on the shaft 258 closes the contacts M47B (FIGS. 46, 47 and 50) of a sole feed switch. A solenoid valve 344 (FIG. 46) consequently admits air under pressure from a source (not shown) to one side of a double acting piston 346 (FIGS. 39 and 46) in a cylinder 348 (FIG. 40) secured horizontally to the frame 336. The piston 346 and its rod 350 are accordingly moved away from the spotting and attaching station. Rack teeth formed on the rod 350 meshing with a pinion 352 (FIGS. 40 and 44), which also has teeth meshing with a rack 354 secured to a sole feed slide 356, thus cause the latter to move toward the sole attaching station between the clips 326 and feed a sole as indicated by dotted lines in FIG. 39. The slide 356 is supported for reciprocable movement in ways formed in a guide bar 358 (FIG. 44) bracketed to the frame 336. To insure that the sole is thus advanced from between its holding clips, a clamping lever 360 pivotally mounted on the slide 356 at 362 (FIGS. 39 and 40) has one end initially arranged adjacent to and above the sole and its other end is biased upwardly by a spring 364 (FIG. 39) seated on the slide. A spring-pressed catch 366 pivotally mounted on the slide is arranged, when the latter is in retracted position, to limit the pivotal movement of the lever 360 in counterclockwise direction as seen in FIG. 39. When the sole is fed toward its shoe, a cam lever 368 pivoted at 370 to the frame 336 and yieldingly urged counter-clockwise (as seen in FIG. 39) against a stop (not shown) engages the upper portion of a roll 372 mounted on the catch 366 to rock it clockwise as shown in FIG. 39 and thus release the lever 360 for clamping engagement of the sole on the slide 356.

Before the soles are clamped onto the slide 356 the following mechanism is operative preliminarily to position the successive soles widthwise on the sole conveyor. A vertically disposed cam 374 (FIGS. 12, 28, 40 and 44) is clamped to one of the head operating rods 298 and arranged, during its descent, to engage and displace a gage actuating roll 376 projecting from a width gaging lever 378 (FIG. 40). This lever is fulcrumed on a bracket 380 also pivotally supporting a cooperating gaging lever 382. Adjacent ends of the levers 378, 382 have a pin and slot connection 384. A torsion spring 386 mounted on a pin 388 in the bracket 380 has one end anchored to the head of the pin and its other end bearing on the lever 378 thus urging the roll 376 against its cam. The sole engaging ends of the levers 378, 382 act to centralize widthwise the successive soles as they are indexed at the stop level just prior to coming to rest on the slide 356.

When the slide 356 has presented a sole over its shoe and under the pad box 308, a cam 390 (FIG. 46) fixed on a rod 298 engages and closes a sole gage switch M39 (FIGS. 28 and 46) to energize a solenoid S13 (FIG. 46) through the closed contacts of the shoe detector switch M27B and the now closed contacts of a sole gage release switch M48 (FIG. 46). The solenoid S13 causes air under pressure to be admitted to a cylinder 392 (FIGS. 36, 38, 40 and 46) secured to the pad box 308 thereby forcing apart equalizing pistons 394, 396 therein. Their piston rods are, for gage closing movements, connected to parallel upper and lower rods 398, 400 (FIG. 37) respectively which are slidable horizontally in bores formed in ears projecting from the pad box 308. Secured to the rod 398 for movement therewith against resistance of a return spring 402 on the rod and abutting a central ear 404 depending from the box is a carrier 406 to which arms 408 (FIGS. 37 and 38) supporting the heel gage 286 are pivotally secured. In like manner a carrier 410 for the toe gage 284 is secured to the rod 400, the carrier 410 affording pivotal support for equalizing levers 412, 412 to the corresponding arms of which the toe gage is affixed. A spring 414 on the rod 400 and abutting the ear 404 acts, when permitted, to return the toe gage to inoperative position. These gages are preferably of Teflon or other material conformable to the work. The heel gage 286 is desirably inclined slightly to the vertical as indicated in FIG. 44 to insure proper sole positioning as the sole gages close and subsequent accommodation of the heel end of the shoe as shown in FIGS. 44 and 45.

Figure 44:
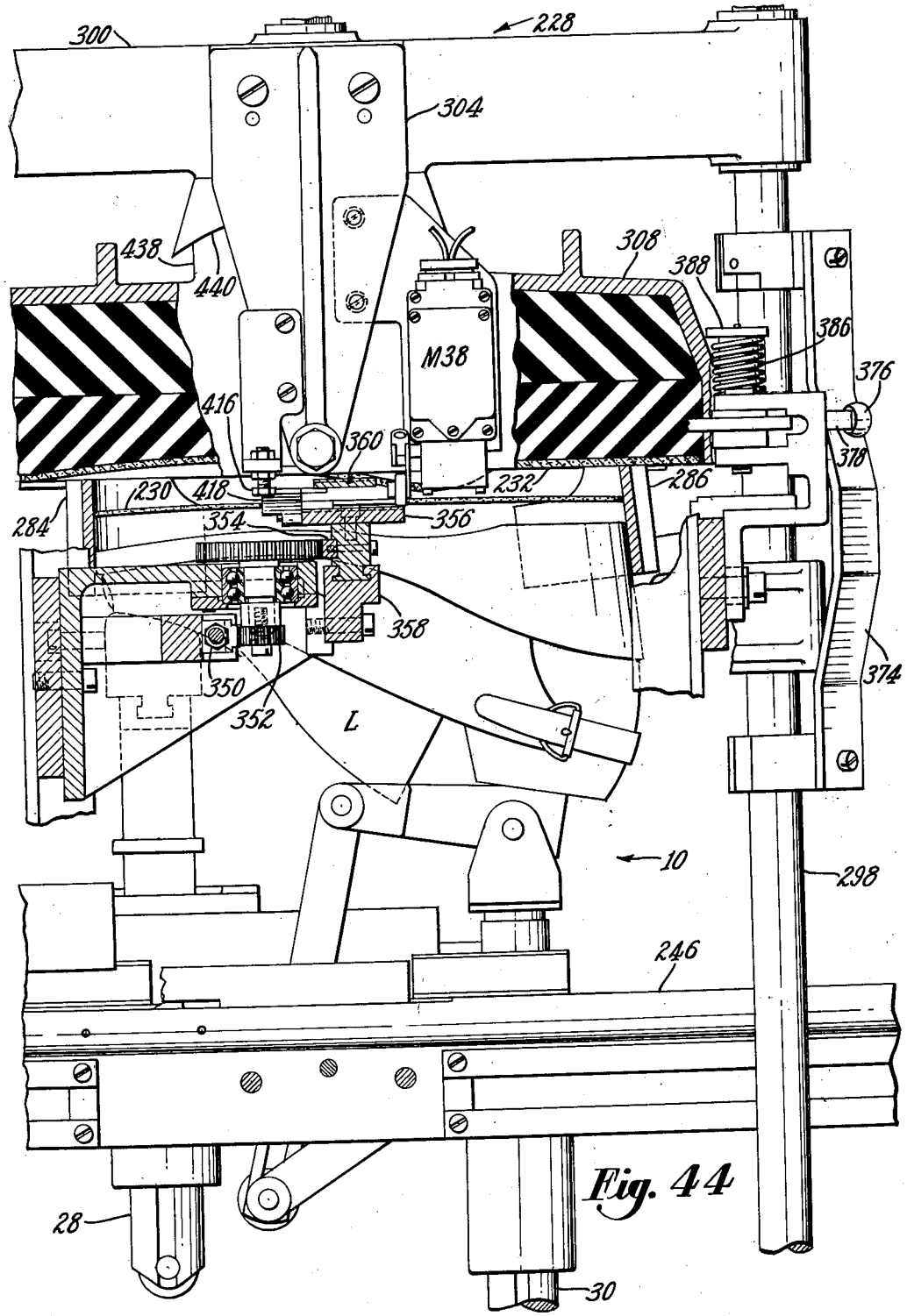
FIG. 44 is a side elevation of the sole attaching station, the presser head and associated sole gaging means being indicated in section and a sole being spotted above the shoe bottom.

With the shoe and its sole now properly located with respect to the nearly fully lowered pad box as shown in FIG. 44, a control switch M38 (FIGS. 39, 40 and 46) secured to the bracket 304 is arranged to be opened by engagement with the sole feed slide 356 thus deenergizing the solenoid S12 to vent the relief valve 312 and depressurize the hydraulic system. The presser head is accordingly now mechanically held in a latched position by means about to be explained. As the head was approaching latching position, a bolt 416 (FIGS. 39 and 44) arranged in the bracket 304 abutted an upturned end portion of a lever 418 pivotally secured to the slide 356 thus causing the other end of the lever to engage the lever 360 and lift it from sole clamping position while restoring the catch 366 in latching relation to the lever 360. The cam 342 (FIGS. 18 and 46) now shifts the contacts of a sole feed switch M47 to actuate the valve 344 whereby air is now admitted to the return side of the piston 346. Hence, the sole feed slide 356 is retracted, the sole being retained by its end gages 284, 286 for attachment. During the latter part of the retraction of the slide 356, the roll 372 merely rides ineffectually over an upwardly inclined portion of the cam lever 368. Referring to FIGS. 32–35, a bracket 422 is clamped to one of the head operating rods 298, and when the head is in its raised inoperative position this bracket is at a slightly higher level than a latching lever 424 the lower end of which is arranged later to cooperate with a notch 426 formed on the bracket 422. The lever 424 is pivotally secured by a pin 428 to an arm 430 fast on the frame. In the descent of the pad box and the bracket 422, the lower end of the lever 424 is swung counterclockwise as seen in FIG. 32 into latching relation with the notch 426 by tension springs 432, 432 connecting the upper end of the lever 424 to the arm 430. The hydraulic system being depressurized at this point as explained, the springs 310 act to hold the head in its latched position against the lever 424 until, in the retraction of the slide 356 to receive the next sole to be attached, the switch M38 is permitted to close, thereby reenergizing the solenoid S12 and repressurising the hydraulic system to cause the pad box to press the spotted sole onto the shoe bottom. In this final sole attaching movement of the presser head, the upper side of the notch 426 cams the lever 424 clockwise as viewed in FIG. 34, thus shifting the springs 432 for acting on the other side of the pin 428 and consequently maintaining the lever 424 substantially vertical and out of position to latch with the notch 426 when the head thereafter is allowed to return to its uppermost inoperative position. A cam 434 formed on an arm 436 clamped to the rod 298 is then disposed to engage the under side of the lever 424 to restore it to its initial toggle relation with the springs 432 as required.

Better to insure accommodation of each shoe during the sole attaching, the upper side of the pad box 308 is preferably formed with a pair of laterally spaced convex rocker portions 438 (FIGS. 37 and 39) arranged to bear on concave bearing members 440, 440 respectively secured to the cross head 300, and a coil spring 442 between these members is confined between the cross head and the box to maintain it in generally horizontal position. Referring to FIG. 18, for guarding against shifting of the shoe during application of sole attaching pressure, a cam 444 affixed to the conveyor frame has an under surface disposed to be engaged by the upper surface of the pallet detent 33 thus positively preventing its displacement and locking the toe post 28 in its operating position.

The switches M44 and M45 had been holding the relay K14 energized after the scoop gage switch M40 was allowed to open upon passage of the shoe to receive its sole, but a cam 446 (FIGS. 18 and 21) on the shaft 258 now opens the switches M44 and M45 to deenergize the relay K14 and unlock the pallet 10 by deenergizing the solenoid S14. Accordingly the pallet locking slide 234 is now spring-returned. The deenergized relay K14 simultaneously deenergized the solenoid S15 to disengage mechanism next to be described for operating the conveyor sole indexing means 226.

Figure 25:
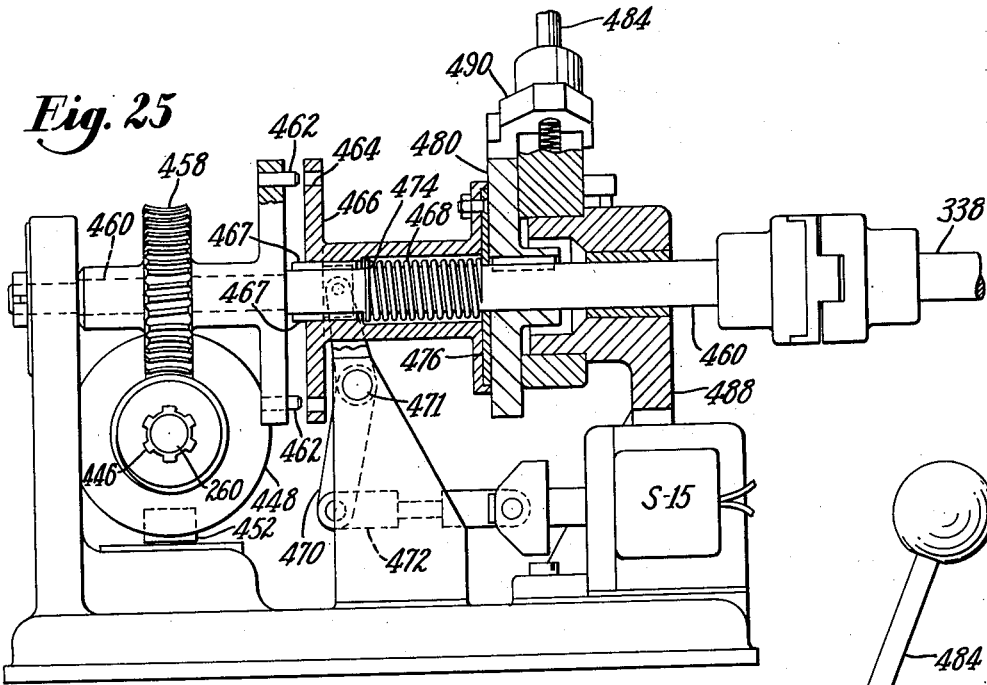
FIG. 25 is a view in elevation and partly in section of manual sole indexing means associated with the spotting and attaching station as indicated in FIG. 18.
Figure 26:
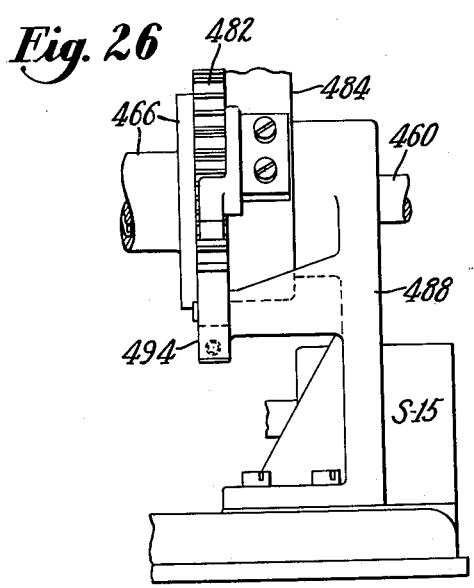
FIG. 26 is a view in elevation of parts shown in FIG. 25.
Figure 27:
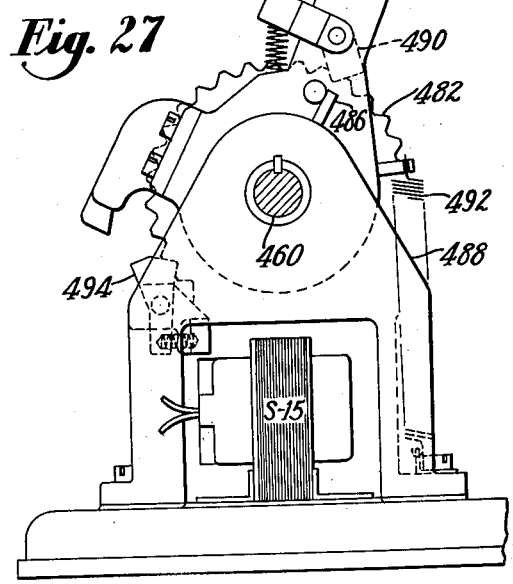
FIG. 27 is a view in end elevation of manual means for controlling sole indexing and partly shown in FIG. 25.
Figure 37:
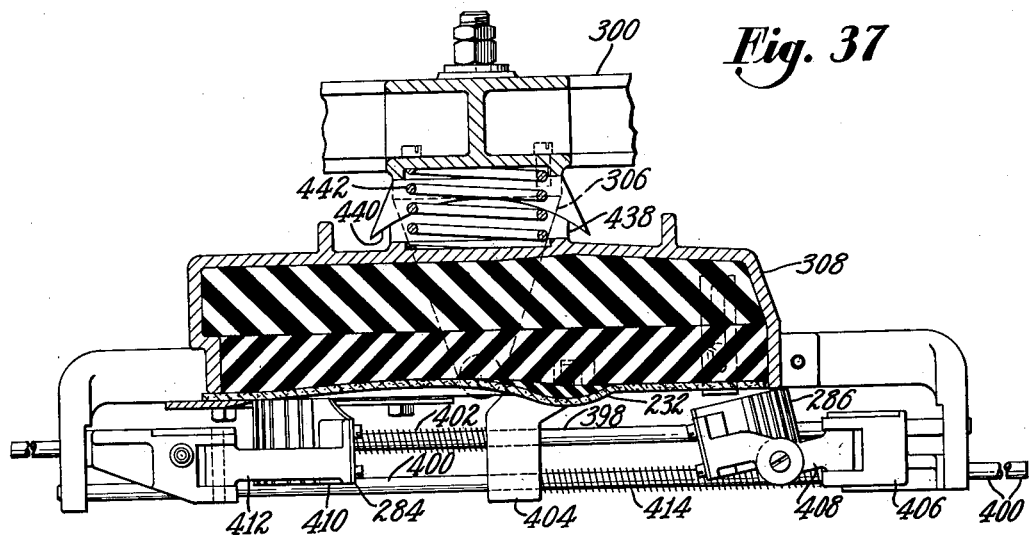
FIG. 37 is a view corresponding to FIG. 36 as seen from the opposite side, a portion of the presser head being shown in section.
Figure 36:
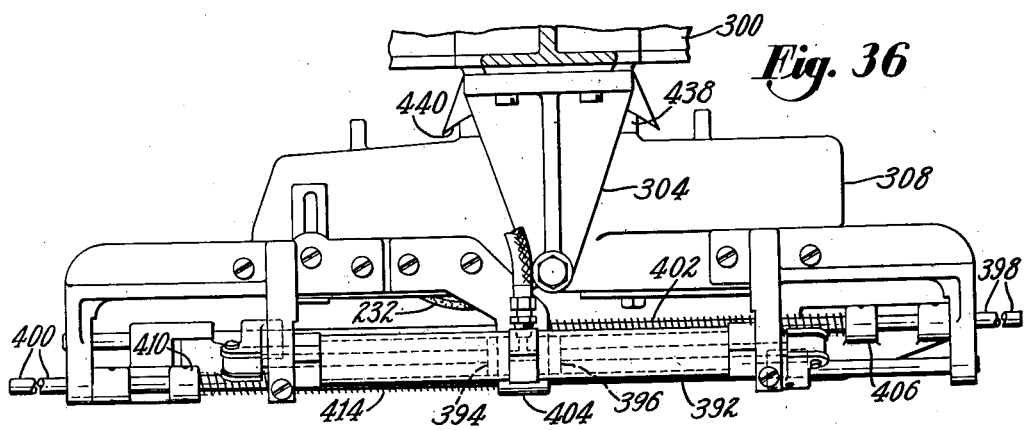
FIG. 36 is a view in side elevation of the presser head.
Figure 38:
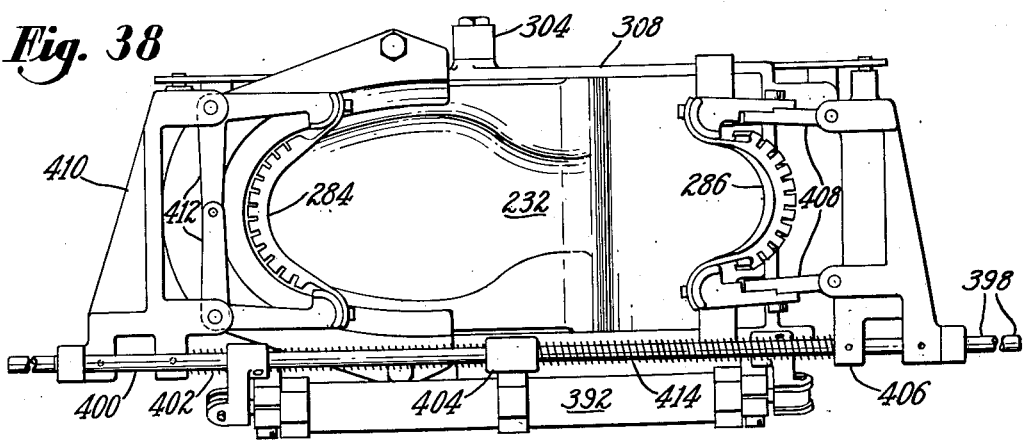
FIG. 38 is a bottom plan view of the presser head together with end gages.

Referring to FIGURES 18, 23 and 25, the shaft 260 normally drives the cross shaft 338 intermittently. For this purpose a portion of the shaft 260 is formed with splines 446 (FIG. 23) engaging splines formed internally on a sleeve 448. The latter is provided with a circular, step type face cam 450 arranged to engage a roller 452 supported on a fixed vertical axis, a compression spring 454 abutting a collar on the shaft and a collar on the sleeve to maintain the roll and face cam engagement. Thus the arrangement is such that rotary movement of the shaft 260 is converted to axial movement of the sleeve 448 in one direction to load the spring 454, external teeth 456 on the sleeve meshing with a gear 458 (FIGS. 23 and 25) rotatably mounted on a shaft 460 suitably coupled to the shaft 338. The gear 458 is integral with a plate portion carrying a pair of axial drive pins 462 arranged to be received in any one of a plurality of corresponding bores 464 formed in a shifter member 466. The latter is moved axially on oppositely disposed splines 467 (FIG. 25) in the shaft 460 into driving relation with the pins 462 against the resistance of a return or disengaging compression spring 468 upon energization of the solenoid S15 by means of a shifter lever 470 pivoted at 471, the upper yoke arm of which is connected to the member 466 and the lower arm of which is connected by a link 472 to the plunger of the solenoid S15. One end of the spring 468 accordingly abuts a collar 474 (FIG. 25) fixed on the shaft 460 and the other end abuts a plate 476 slidable axially on the shaft but secured to the member 466. For setting-up purposes, or for appropriate indexing of soles on the means 266 with the particular sizes and styles of the oncoming shoes, especially for instance, if a shoe has not been pallet-mounted or has been removed from the conveyor, means next to be described is provided. A wheel 480 (FIGS. 25–27) is splined to the shaft 460 and formed with ratchet teeth 482. For turning this wheel to index soles step-by-step by hand, a lever 484 is mounted to swing concentrically to the extent determined by a stop pin 486 projecting from a bearing bracket 488 for the shaft 460, a spring-pressed pawl 490 pivotally carried by the lever 484 meshing with the teeth 482. A tension spring 492 (FIG. 27) connecting the lever 484 and the bracket 488 normally holds the pawl 490 engaged, and a spring-pressed dog 494 (FIG. 27) is disposed normally to prevent reverse rotation of the shaft 460.

The formerly closed contacts of the switch M48 (FIGS. 20 and 46) are opened at the proper time by a cam 500 of the shaft 258 to deenergize the solenoid S13 and hence permit the sole gages 284, 286 to be spring-returned to their initial open positions. Also, the cam 446 allows the switches M44, M45 to close in preparation of the scoop-gaging circuit for the succeeding shoe. To permit the springs 310 to return the pad box 308 to its initial inoperative position, the cam 320 now deenergizes the solenoid S12 by opening the switch M37 thus exhausting the hydraulic system. In the course of the rising of the pad box the cam 390 allows the sole gage switch M39 to open whereupon the pallet transfer slide 246 feeds the sole-attached shoe and its pallet out of the station as the next shoe is fed into this station. The switch M39 hence insures against crushing the sole gages between the presser head and the shoe.

In conjunction with the conveyor and station control system next to be explained other electrical interlock means are provided to guard against damage to operating personnel or to the apparatus. A 3-pole circuit breaker and switch M1 (FIG. 48) are initially closed to energize relays K11 and K19 thus closing contacts K11A, K11B, K11C, K11D, K19A, K19B, K19C, K19D and lighting pallet light PL1 at the control stand adjacent to the loading station. The conveyor motor 24 is started by closing a push button switch M2 (FIGS. 1 and 48) to energize a conveyor motor-controlling coil through a normally closed contact K1A (FIGS. 1 and 48), the coil being kept energized by a holding circuit upon the release of the switch M2. (Emergency switch M3 is accessible to stop the conveyor if necessary.) In their respective stations coils K3, K4 (FIG. 48), K5, K6, K7 (FIG. 49), and K8 (FIG. 50) are consequently energized respectively to open normally closed contacts K3, K4, K5, K6, K7 and K8 (FIG. 48). In this way a circuit to a pallet-operated switch M6 (FIGS. 1 and 48) is normally kept open for a purpose about to be explained and a relay K1 cannot then be energized to stop the conveyor every time a pallet closes the switch M6. It will be noted (FIG. 48) that the latter, for stopping the pallet conveyor only between the periods of operation of the various operating stations, preferably is located to be actuated by each pallet after passing the toe and heel roughing stations as shown in FIG. 1 and is in a circuit including the relay K1 and has, in series, a normally open shoe detector switch M26 (FIGS. 14, 15 and 48) at the scoop gaging zone and a normally closed shoe detector switch M27A at the sole attaching station. Should the relay K1 become energized, of course, the switch K1A would be opened to stop the conveyor. Each operating station has a manual set up switch, M20 to M25 inclusive being shown, which can be operated to by-pass relay K2 and run individual station motors when desired; each station also includes a manually operated "run-hold" switch, M8 through M13 being shown, to operate the conveyor. In FIG. 48, M20 and M8, for example, pertain to the toe roughing station. At the control stand is a manual pallet control switch M7 (FIGS. 1 and 48) which, when closed, functions in a manner comparable to the switches M8—M13. That is to say, in order to avoid the conveyor being stopped by a pallet at an operating station and thus, for instance, avoid having a shoe receive excessive cement or be damaged by dwell in engagement with a roughing tool, the switch M7 may be closed to operate the conveyor only until the pallets 10 are moved to an intermediate position between stations, the switch M6 then being closed by one of the pallets so positioned and thereby causing the conveyor-stopping relay K1 to operate.

In order to prevent the pallet transfer mechanism from trying to feed a shoe out of the sole attaching station, if for some reason the presser head remains in its downward position, and thus damage the sole gage mechanism, a normally open, held-closed safety switch M46 (FIGS. 18, 46 and 48) is arranged to be held open by a cam 502 (FIG. 46) secured to one of the rods 298 when the presser head is up, and is closed when this head is down. Accordingly, if the head is not fully up when it is time for the shoe and its attached sole to be advanced, the switch M46 will be closed to energize the conveyor between-stations-stop circuit through the switch M6.

In approaching the sole attaching station, if a pallet or pallets were empty because the operator had failed to load a shoe or shoes or the shoe which had been loaded was removed at an intermediate stage due to damage, for example, the conveyor is automatically stopped to allow the operator to determine whether a corresponding sole or soles needs to be removed from the sole conveyor indexing means 226. Upon removing a sole the operator will index the sole conveyor as needed by the hand lever 484 since the empty pallet(s) will not have closed the switch M40 and thus cause this conveyor to index. The above-mentioned switches M26 and M27A are employed in series to stop the shoe conveyor when the first shoe arrives at the scoop gaging zone, i.e. at the switch M26, following any number of empty pallets 10. Thus, as tabulated in FIG. 15, of four possible combinations of a shoe being present or absent at these detector switches, the relay K1 is only energized to stop the shoe conveyor if there is a shoe present to close the switch M26 and, simultaneously, there is no shoe present to open the switch M27A. In the other three situations, i.e. when shoes are at both the scoop gaging zone and the sole attaching position, when the pallets at both of these positions are empty, and when a shoe is at the sole attaching position but none is at the scoop gaging zone, the shoe conveyor keeps running.

It will be appreciated from the foregoing that with one operator to load and unload shoes and perhaps only one other operator to load the sole indexing mechanism, the novel apparatus afforded by this invention enables a high rate of shoe making to be performed.

Having thus described our invention, what we claim as new and desire to secure by Letters Patent of the United States is:

1. A shoemaking system having a conveyor and a plurality of spaced stations along the course of the conveyor, at least one of said stations being provided with a device for operating upon the bottoms of shoes carried successively by the conveyor, and means mounted on one of the stations in advance of the operating station for bringing the shoes successively to the level of the device at the operating station.

2. A shoemaking system as set forth in claim 1 and further characterized in that said means is provided with a guide disposed to act on the bottom of each shoe to move it heightwise to the level of the operating device at the operating station.

3. In a shoemaking system comprising a conveyor and a plurality of spaced stations along the course of the conveyor, at least one of the stations including a device operative on shoe bottoms, a plurality of shoe-carrying pallets on the conveyor, each of said pallets having a slidable shoe support, and means mounted on one of the stations in advance of the operating station for engaging the successive shoes to slide their respective supports, thereby to position each shoe in operative relation to the device.

4. In a system as set forth in claim 3, a lock mechanism for supporting the slide against movement on the pallet after being brought to the level of the device at the operating station to sustain the shoe while work is performed thereon.

5. In a shoemaking system having a conveyor, a plurality of spaced stations along the course of the conveyor at least one of which is provided with a device for operating upon the bottom of a shoe, pallets on said conveyor having separate heel and forepart supporting means for a shoe, means at one of said stations between two other stations for leveling the shoes on the pallets comprising an abutment located to engage a shoe, yielding means acting upon at least one of said pallet shoe supporting means to press the shoe against the abutment, and means for locking the yieldingly pressed supporting means relatively to its pallet while the shoe is at the operating station.

6. A shoemaking system comprising operating means for acting upon the bottom of a shoe, conveying means for presenting a series of shoes in succession to said operating means in a direction extending lengthwise of the shoe, said conveying means comprising a pallet for each shoe, each pallet having separate supporting means for the heel part and forepart of a shoe carried thereby, and means adjacent to the conveyor means and ahead of said operating means for setting said supporting means to bring the bottom of the heel part of the shoe to a predetermined level corresponding with a tool of said operating means and to bring a portion of the bottom of the forepart intermediate between the ball line and the toe end also to said predetermined level.

7. A shoemaking system comprising operating means for acting upon the bottom of a shoe, conveying means for presenting a series of shoes in succession to said operating means in a direction extending lengthwise of the shoe, said conveying means comprising a pallet for each shoe, each pallet having separate supporting means for the heel part and forepart of a shoe carried thereby, means ahead of the operating means for leveling a shoe on each pallet comprising an abutment having a fixed section and a displaceable section, locking means for releasably holding said displaceable section at the level of said fixed section, means acting upon said supporting means to bring the bottom of the shoe into engagement with said abutment, means for locking said heel part supporting means with respect to the pallet, means for releasing the first mentioned locking means to permit said displaceable section of said abutment to move in a direction extending away from the shoe bottom in response to movement of the shoe away from said fixed section, and means for locking said forepart supporting means with respect to the pallet upon the departure from said fixed section of a portion of the bottom of the forepart of the shoe intermediate between its ball line and toe end.

8. In a shoemaking system for performing a plurality of operations simultaneously upon a series of shoes, a plurality of operating means, and a conveying means for carrying the shoes to and away from one of said operating means with an intermittent movement and for presenting the shoes to the other of said operating means with a continuous movement at the frequency of a cycle of said intermittent movement.

9. A shoemaking system for operating upon a plurality of shoes comprising a plurality of operating means, and conveying means for continuously carrying a shoe to and away from each of certain operating means simultaneously at a constant velocity and for carrying shoes intermittently to and away from one of said operating means with the same frequency at which the shoes are presented to said certain operating means.

10. A shoemaking system for adhesively attaching soles to shoes comprising operating means for preparing a shoe bottom for an adhesive, operating means for applying adhesive to the prepared portions of the shoe bottom, operating means for applying a sole to the shoe, and conveying means for presenting a series of shoes to said operating means in succession, said conveying means also being arranged to present a shoe to each machine simultaneously.

11. A system as set forth in claim 10 and further characterized in that mechanism is provided for cooperating with said conveying means to fix the level of successive shoe bottoms according to their respective heightwise curvature prior to their presentation to said operating means.

12. A shoemaking system for adhesively applying soles to shoe bottoms comprising means for preparing the bottom of a shoe for an adhesive, means for applying adhesive to the prepared portion of the shoe bottom, means for applying a sole to the shoe bottom, and conveying means for presenting a series of shoes to said means in succession, said conveying means being constructed and arranged to present the shoes to certain of said means by a continuous movement of constant velocity and to move the shoes to and from one of said means by movements of different velocity separated by a dwell.

13. A shoemaking system for adhesively applying soles to shoes comprising an operating means for preparing the bottom of a shoe for an adhesive, an operating means for applying adhesive to the prepared portion of the shoe bottom, an operating means for applying a sole to the shoe bottom, and conveyor means for presenting a series of shoes to said operating means successively, said conveyor means being constructed and arranged to present shoes to said operating means simultaneously and at the same frequency.

14. A shoemaking system for adhesively applying soles to shoes comprising operating means for preparing the bottom of a shoe for an adhesive, operating means for applying adhesive to the prepared shoe bottom, operating means for applying a sole to the shoe bottom, first conveying means for carrying a shoe into and out of said last-mentioned operating means with a dwell in the movement of the shoe while it is being operated upon, and a second conveying means synchronized with said first conveying means for presenting shoes simultaneously to the other of said operating means at a constant velocity and at a frequency equal to that of the cycle of operation of said first conveyor means.

15. A system as set forth in claim 14 and further characterized in that an auxiliary conveyor is arranged to present successive soles to said sole applying means, indexing of the auxiliary conveyor being responsive to operation of said first conveying means.

16. A shoemaking system comprising a plurality of operating stations, work handling apparatus comprising an endless conveyor for carrying shoes on pallets into and out of said operating stations, said pallets being equally spaced from each other lengthwise of said conveyor, said operating stations being spaced at different distances in the direction of movement from a reference point on said conveyor which are integral multiples of the spacing of said pallets, means for driving said conveyor, and control means for stopping said driving means, said control means comprising apparatus actuated by said pallets for timing the stopping of said conveyor so that it occurs approximately when each pallet is spaced from said reference point at an odd multiple of one half the spacing of the pallets.

17. A shoemaking system comprising a plurality of operating stations, work handling apparatus comprising a conveyor having an endless driving member upon which are mounted a plurality of equally spaced shoe-bearing pallets, said stations being spaced from each other lengthwise of the conveyor by distances which are integral multiples of the spacing of said pallets from each other, means for driving said conveyor to cause the shoe bearing pallets to be carried into and out of said stations, and control means for automatically stopping the operation of said driving means when a point on said endless driving member midway between successive pallets is in register with one of said operating stations.

18. A shoemaking system comprising a plurality of operating means, conveyor means for presenting a series of shoes to said operating means successively, different shoes of said series being presented to different operating means substantially simultaneously and at the same frequency, and automatic control means for stopping the operation of said conveying means, said control means comprising apparatus for timing the stopping of said conveying means so that it occurs between the periods of operation of said operating means upon the shoes.

19. A shoemaking system comprising an operating means, conveying means for presenting a series of shoes to said operating means with a predetermined frequency, means for detecting the absence of a shoe on said conveying means, and control means actuated by said detecting means for stopping the operation of said conveying means intermediate between the extremes of the period required for successive shoes to pass in engagement with said operating means.

20. A shoemaking system for adhesively applying soles to shoes the bottoms of which are respectively formed with a scoop portion comprising operating means for applying a sole to a shoe bottom, a scoop gaging means ahead of said operating means, a main conveyor for feeding successive equally spaced shoe-carrying pallets through preparatory stations to said scoop gaging means, the main conveyor being diverted about said sole applying means, and an auxiliary reciprocable pallet conveyor operating with the frequency with which the main conveyor feeds the pallets to said gaging means, said auxiliary conveyor being arranged and adapted successively to advance two pallets simultaneously, one from the gaging means to the sole applying means and the other from said sole applying means to be returned to the main conveyor.

21. A system as set forth in claim 20 wherein the auxiliary conveyor includes a pallet transfer slide operatively connected to the main conveyor, a pallet locking slide cooperative with the pallet transfer slide, and automatic control means responsive to the distance of the scoop portion of a shoe bottom at the scoop gaging means from a corresponding portion of said sole applying means to determine the feed stroke of the pallet locking slide whereby the scoop portions of the last-mentioned means and the shoes are registered.

22. A shoe bottoming system comprising main conveyor means including a succession of normally equispaced shoe-carrying pallets, a sole attaching station having a reciprocable pad box for cooperating with successive pallets and about which said conveyor means is diverted, operating means along the path of the conveyor for preparing successive shoe bottoms as they advance to the sole attaching station, a leveling station arranged and adapted to position the successive shoe bottoms relative to their respective pallets to locate the bottoms for the action of said operating means and said pad box, auxiliary conveyor means for transferring the successive pallets from the main conveyor means to a dwell position in register with the pad box and then back to said main conveyor means, and a sole indexing mechanism operative in timed relation to the main and auxiliary conveyor means for successively presenting the soles to be attached to a position intermediate to the pad box and the pallet at said dwell position.

23. A machine as set forth in claim 22 and further characterized in that said leveling station is adapted horizontally to position each shoe bottom so that its ball portion is as much higher than the ends of the shoe bottom, which are on the same level, as its scooped portion is below said level.

References Cited in the file of this patent

UNITED STATES PATENTS

| | | |
|---|---|---|
| 2,443,877 | Vacin | June 22, 1948 |
| 2,572,011 | Cohen et al. | Oct. 23, 1951 |